United States Patent
Wong et al.

(10) Patent No.: US 10,331,942 B2
(45) Date of Patent: Jun. 25, 2019

(54) FACE LIVENESS DETECTION

(71) Applicant: Facebook, Inc., Menlo Park, CA (US)

(72) Inventors: Donald Kinhang Wong, Palo Alto, CA (US); Rajesh Janakiraman, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/610,273

(22) Filed: May 31, 2017

(65) Prior Publication Data
US 2018/0349682 A1 Dec. 6, 2018

(51) Int. Cl.
*G06K 9/00* (2006.01)

(52) U.S. Cl.
CPC ..... *G06K 9/00288* (2013.01); *G06K 9/00281* (2013.01); *G06K 9/00906* (2013.01)

(58) Field of Classification Search
CPC ........... G06K 9/00221; G06K 9/00248; G06K 9/00255; G06K 9/00261; G06K 9/00268; G06K 9/00281; G06K 9/00302; G06K 9/00308; G06K 9/00315; G06K 9/00335; G06K 9/00597; G06K 9/00604; G06K 9/0061
See application file for complete search history.

(56) References Cited

U.S. PATENT DOCUMENTS

| | | | |
|---|---|---|---|
| 7,253,738 B2 * | 8/2007 | Hammond | G06K 9/00597 340/573.1 |
| 8,949,619 B2 | 2/2015 | Parry et al. | |
| 9,137,246 B2 | 9/2015 | Parry et al. | |
| 9,600,649 B2 | 3/2017 | Parry et al. | |
| 9,690,988 B2 * | 6/2017 | Mohanakrishnan | G06K 9/00597 |
| 9,740,848 B2 | 8/2017 | Parry et al. | |
| 10,049,203 B2 | 8/2018 | Parry et al. | |
| 2005/0259220 A1 * | 11/2005 | Neadle | G02C 7/04 351/159.14 |
| 2006/0203088 A1 * | 9/2006 | Hammoud | G06K 9/00597 348/78 |

(Continued)

OTHER PUBLICATIONS

Kollreider, et al., "Evaluating Liveness by Face Images and the Structure Tensor," Fourth IEEE Workshop on Automatic Identification Advanced Technologies, 2005, 6 pages.

(Continued)

*Primary Examiner* — Wesley J Tucker
(74) *Attorney, Agent, or Firm* — Kilpatrick Townsend & Stockton LLP

(57) ABSTRACT

Disclosed herein are techniques for face-based user authentication. In one embodiment, a method includes receiving a sequence of image frames captured of a face of a subject, and calculating, for each image frame in a set of image frames from the sequence of image frames, a closity value for the image frame based upon a plurality of angles associated with an eye in the image frame. The closity value calculated for the image frame is indicative of a measure of closeness of the eye in the image frame. The method further includes determining a number of eye blinks occurring in the set of image frames based upon the closity values calculated for the set of image frames, determining liveness of the face of the subject based upon the number of eye blinks, and enabling authentication of the subject based upon the liveness determination.

19 Claims, 16 Drawing Sheets

1000

(56) References Cited

U.S. PATENT DOCUMENTS

2014/0081178 A1* 3/2014 Pletcher .................. G02C 7/04
600/595
2014/0165187 A1* 6/2014 Daesung ................. G06F 21/32
726/19
2018/0307823 A1 10/2018 Parry et al.

OTHER PUBLICATIONS

Li, et al., "Seeing Your Face Is Not Enough: An Inertial Sensor-Based Liveness Detection for Face Authentication," Conference: The 22nd ACM Conference on Computer and Communications Security (CCS), at Denver, CO, U.S.A, 2015, pp. 1558-1569, 12 pages.

Pan, et al., "Eyeblink-based Anti-Spoofing in Face Recognition from a Generic Webcamera," Proceedings / IEEE International Conference on Computer Vision. IEEE International Conference on Computer Vision, 2007, 8 pages.

\* cited by examiner

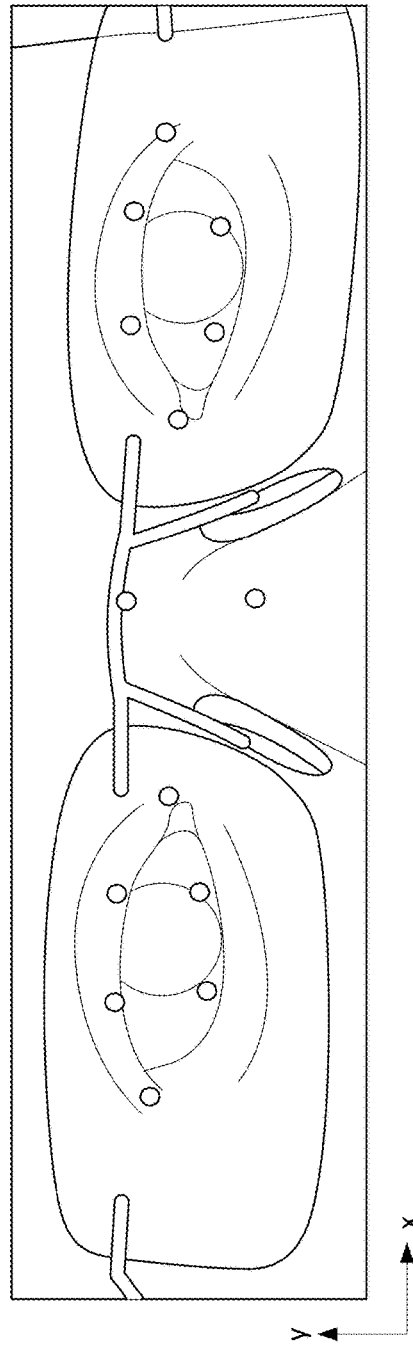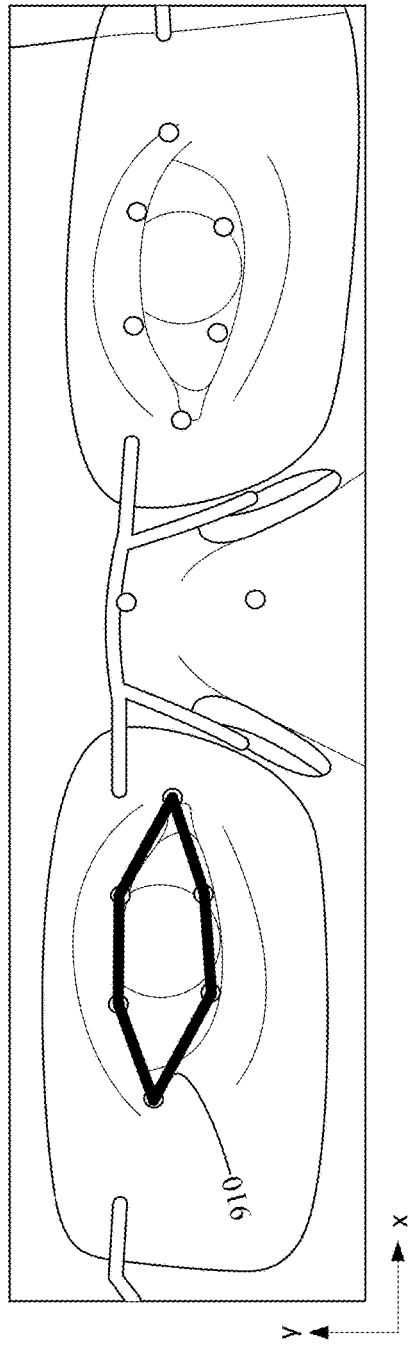
FIG. 9A
FIG. 9B

| | No Smile | Closed Smile | Difference (%) | Open Smile | Difference (%) | Threshold |
|---|---|---|---|---|---|---|
| Total Height | 0.16462 | 0.10229 | 37.87% | 0.23103 | 40.34% | 25% |
| Width/Height Ratio | 2.44989 | 4.76279 | 94.41% | 1.92104 | 21.59% | 50% |
| Opening Height | 0.0243 | 0.00824 | 66.10% | 0.08555 | 252.13% | 100% |
| Left Corner to Middle in Y Axis | -0.01026 | 0.01643 | 260.04% | 0.059 | 674.77% | 200% |
| Right Corner to Middle in Y Axis | 0.00155 | 0.03546 | 2183.19% | 0.07025 | 4423.44% | 200% |

FIG. 13

FACE LIVENESS DETECTION

BACKGROUND

The present disclosure generally relates to user authentication on a computing system, and more particularly to improved techniques for face-based user authentication.

Biometrics-based authentication techniques are becoming popular as alternatives to traditional password-based user authentication techniques or as part of multi-factor authentication techniques in addition to traditional password-based authentication techniques. Compared with password-based user authentication techniques, biometrics-based authentication techniques require no user memorization and may provide a higher level of credibility for authenticating users.

One such biometrics-based technique is face authentication, where one or more images of a person's face are captured and used to authenticate that person. However, many existing face authentication techniques are vulnerable to forgery, such as media-based facial forgery, where an adversary may use a photo or video of a valid user to fool the authentication system.

SUMMARY

The present disclosure generally relates to user authentication on a computing system. More specifically, techniques disclosed herein may be used to detect facial forgery (e.g., using still images) during image-based user authentication, based on more accurate liveness detection of the face of a user of a secure system, without requiring pre-training. In various embodiments, the liveness of the face of the user may be determined based on one or more types of motion detected in a sequence of captured image frames of the face of the user being authenticated, such as motions in the eyes (e.g., eye blinks), mouth (e.g., smiles), and head (e.g., rotations).

In some embodiments, a closity value may be calculated for each image frame in a set of image frames from the sequence of captured image frames, based on, for example, a plurality of angles associated with the eye(s) in the image frame. A sequence of eye state transitions may then be determined based on the changes in the closity value in the set of image frames. An eye blink may be detected each time the state of the eye goes through an OPEN state, a CLOSING state, a CLOSED state, an OPENING state, and the OPEN state sequentially. The liveness of the face of the user may then be determined based on the number of eye blinks detected using the sequence of captured facial image frames. In some examples, an overall facial liveness detection result may be determined based on a combination of multiple detection results from multiple liveness detection techniques that are based on, for example, eye blinks, smiles, and head rotations.

In certain embodiments, a method that can be performed by a computing system is disclosed. The method may include receiving a sequence of image frames captured of a face of a subject, and calculating, for each image frame in a set of image frames from the sequence of image frames, a closity value for the image frame based upon a plurality of angles associated with an eye in the image frame. The closity value calculated for the image frame may be indicative of a measure of closeness of the eye in the image frame. The method may further include determining a number of eye blinks occurring in the set of image frames based upon the closity values calculated for the set of image frames, determining liveness of the face of the subject based upon the number of eye blinks, and enabling authentication of the subject based upon the liveness determination.

In some embodiments of the method, calculating the closity value for the image frame may include determining a shape corresponding to an opening area associated with the eye in the image frame, and calculating the closity value based upon an area of the shape. In some embodiments, calculating the closity value for the image frame based upon the plurality of angles may include determining a first angle associated with a first area of the eye in the image frame, determining a second angle associated with a second area of the eye in the image frame, where the second area is different from the first area, and calculating the closity value for the image frame based upon the first angle and the second angle. In some embodiments, the first area is a first corner of the eye in the image frame, and the second area is a second corner of the eye in the image frame. In some embodiments, calculating the closity value for the image frame based upon the plurality of angles may further include determining a third angle associated with a first area of a second eye of the subject in the image frame, determining a fourth angle associated with a second area of the second eye in the image frame, and calculating the closity value for the image frame based upon the first angle, the second angle, the third angle, and the fourth angle.

In some embodiments of the method, determining the number of eye blinks based upon the closity values calculated for the set of image frames may include determining a sequence of eye transitions based upon the closity values calculated for the set of image frames. An eye transition in the sequence of eye transitions may include a transition from an OPEN state to a CLOSING state, a transition from the CLOSING state to a CLOSED state, a transition from the CLOSED state to an OPENING state, or a transition from the OPENING state to the OPEN state, in a subset of consecutive image frames. In some embodiments, determining the number of eye blinks may include determining an occurrence of an eye blink in response to detecting a transition of the eye from the OPEN state to the CLOSING state, followed by a transition of the eye from the CLOSING state to the CLOSED state, followed by a transition of the eye from the CLOSED state to the OPENING state, and followed by a transition of the eye from the OPENING state to the OPEN state in consecutive image frames from the set of image frames.

In some embodiments, the method may include determining the liveness of the face of the subject based upon a smile of the subject detected in the set of image frames. Detecting the smile of the subject may include determining, for each frame in a second set of image frames from the set of image frames, at least two parameters of an overall height of a mouth of the subject, a width-to-height ratio of the mouth, a height of opening of the mouth, a difference in height between a left corner of the mouth and a center of the mouth, a difference in height between a right corner of the mouth and the center of the mouth, or an opening area of the mouth. The smile of the subject may be detected based upon changes of the at least two parameters in the second set of image frames.

In some embodiments of the method, receiving the sequence of image frames captured of the face of the subject may include receiving, for each image frame of the sequence of image frames, information regarding a plurality of feature points for the face of the subject in the image frame. In some embodiments, the method may include, for each image frame in the sequence of image frames, determining an angle of rotation of a head of the subject with respect to a position of the head in a reference image frame from the sequence of image frames, or a velocity of movement of a feature point from the plurality of feature points on the face with respect to a previous image frame in the sequence of image frames. The method may also include indicating that the image frame is invalid in response to determining that the angle of rotation or the velocity of movement is greater than a threshold value. In some embodiments, the method may further include, for each image frame in the set of image frames, determining an angle between an axis of the image frame and a line determined by two feature points of the plurality of feature points, and rotating the plurality of feature points on the face of the subject by the angle with respect to a reference feature point on the face of the subject. In some embodiments, the method may further include, for each image frame in the set of image frames, determining a minimum bounding box that includes all feature points of the plurality of feature points on the face of the subject in the image frame. The method may also include, for each feature point in the plurality of feature points in the image frame, determining a location of the feature point relative to a reference point of the minimum bounding box, and scaling the location of the feature point by a factor determined based upon a width or height of the minimum bounding box.

In some embodiments of the method, determining the liveness of the face of the subject may also include indicating successful liveness detection of the face upon determining that the number of eye blinks occurring in the set of image frames is within a range, and additionally, a smile or a head movement of the subject is detected in the set of image frames. In some embodiments, the method may further include, upon determining that the face of the subject is live, sending at least a subset of image frames from the set of image frames to a server for verifying that the face of the subject is live.

In certain embodiments, a non-transitory computer-readable storage medium storing a plurality of instructions executable by one or more processors is disclosed. The plurality of instructions, when executed by the one or more processors, may cause the one or more processors to receive a sequence of image frames captured of a face of a subject, and calculate, for each image frame in a set of image frames from the sequence of image frames, a closity value for the image frame based upon a plurality of angles associated with an eye in the image frame. The closity value calculated for the image frame may be indicative of a measure of closeness of the eye in the image frame. The plurality of instructions may further cause the one or more processors to determine a number of eye blinks occurring in the set of image frames based upon the closity values calculated for the set of image frames, determine liveness of the face of the subject based upon the number of eye blinks, and enable authentication of the subject based upon the liveness determination.

In certain embodiments, a system including one or more processors and a non-transitory computer-readable medium storing instructions is disclosed. The instructions, when executed by the one or more processors, may cause the one or more processors to perform operations including receiving a sequence of image frames captured of a face of a subject, and calculating, for each image frame in a set of image frames from the sequence of image frames, a closity value for the image frame based upon a plurality of angles associated with an eye in the image frame. The closity value calculated for the image frame may be indicative of a measure of closeness of the eye in the image frame. The instructions may further cause the one or more processors to perform operations including determining a number of eye blinks occurring in the set of image frames based upon the closity values calculated for the set of image frames, determining liveness of the face of the subject based upon the number of eye blinks, and enabling authentication of the subject based upon the liveness determination.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

Illustrative embodiments are described in detail below with reference to the following figures:

FIG. 9A illustrates an example image frame depicting extracted feature points associated with the eyes of a subject according to certain embodiments;

FIG. 9B illustrates an example image frame depicting an opening area of an eye represented by a polygon according to certain embodiments;

FIG. 13 illustrates example data of parameters associated with a mouth in different states according to certain embodiments;

DETAILED DESCRIPTION

Figure 1:
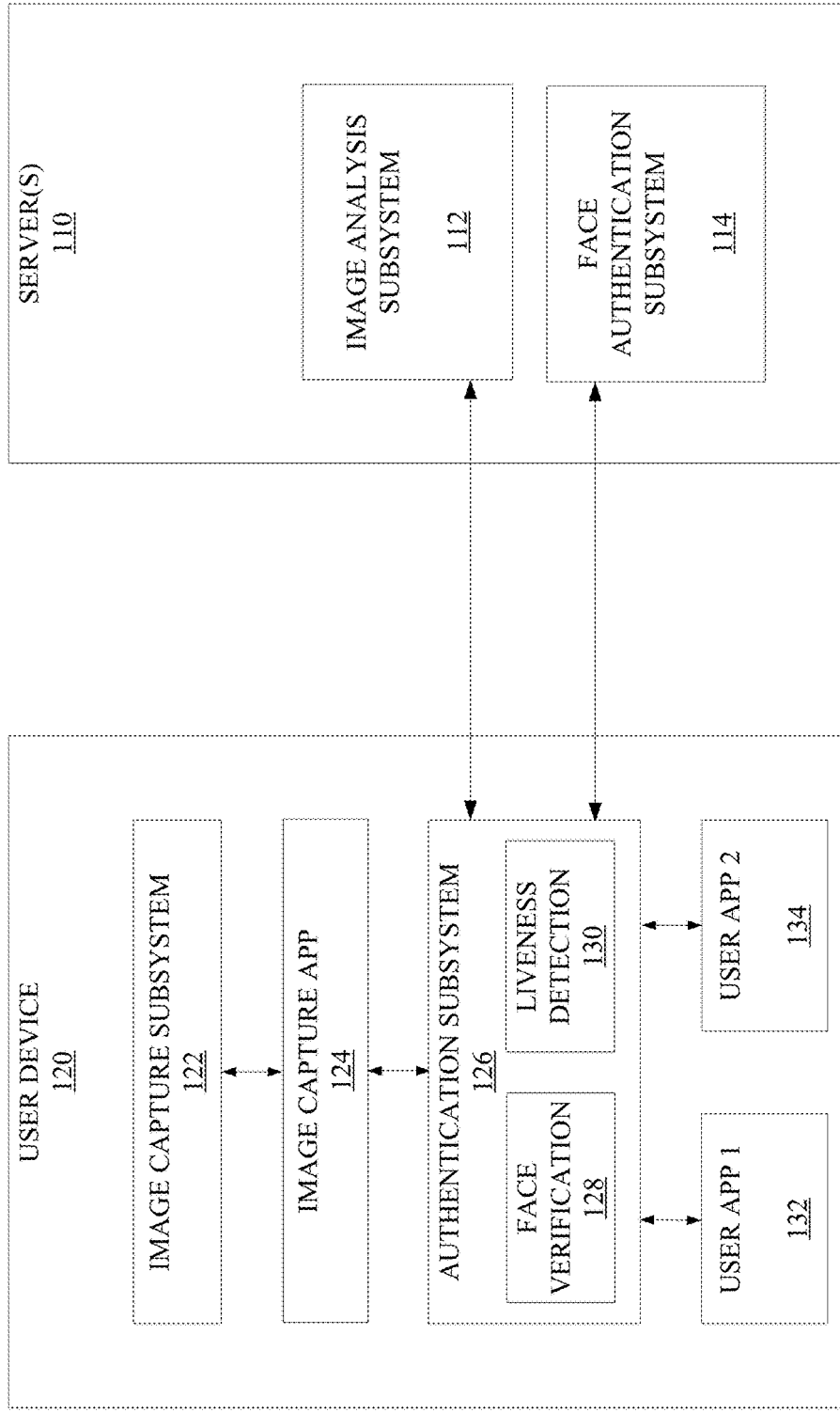
FIG. 1 is a simplified block diagram of an example system that enables face-based user authentication according to certain embodiments.

In the following description, for the purposes of explanation, specific details are set forth in order to provide a thorough understanding of examples of the disclosure. However, it will be apparent that various examples may be practiced without these specific details. For example, devices, systems, networks, processes, and other components may be shown as components in block diagram form in order to not obscure the examples in unnecessary detail. In other instances, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof.

Biometrics is an emerging technology that recognizes human identities based upon one or more intrinsic human physiological or behavioral characteristics, such as faces, fingerprints, irises, voice, etc. However, spoofing attack (or copy attack) may be a fatal threat to at least some biometric authentication systems. For example, face recognition-based authentication may be susceptible to facial forgery or spoofing. A common facial forgery may use a facial photograph of a valid user to spoof the face recognition system. Because one's facial image may be easily acquired by the public (e.g., downloaded from the web or captured unknowingly by a camera), photo attacks are one of the cheapest and most common spoofing approaches.

More recently, face recognition systems employ liveness detection techniques to prevent such spoofing attacks. A liveness detection technique determines whether or not the face being used for authentication is a live face. Liveness detection may be performed based upon recognizable human physiological activities.

Unfortunately, liveness detection-based face recognition systems also face various spoofing attacks, such as, for example, still-image based spoofing, video-based spoofing, and three-dimensional (3-D) mask/model-based spoofing. Video-based spoofing and 3-D mask/model-based spoofing may be more difficult to accomplish because facial videos may be more difficult to obtain and building 3-D masks or models may be time consuming and may require special equipment. Still-image based spoofing may be easy to perform. For example, an imposter may rotate, shift, and/or bend a valid user's photo in front of the camera to deceive the face recognition system. In many cases, it may be challenging to determine whether an input facial image is from a live face or from a photograph.

Existing techniques for liveness detection may suffer from, for example, sensitivity to noise, low accuracy, low confidence level, additional hardware requirements, and user collaboration requirement. For example, for eye blink detection, highly controlled lighting conditions and high-quality input data may generally be needed. Some techniques may require a pre-existing facial model for use as, for example, a reference, or may require pre-training, for example, to build a classifier or classification model.

Techniques disclosed herein can be used to more accurately and more confidently detect the liveness of a face of a user being authenticated by detecting facial motions in, for example, eyes (e.g., blinking), mouth (e.g., smiling), and/or head (e.g., rotation) of the user being authenticated, to prevent spoofing attacks during image-based user authentication. The detected liveness information may be used alone or in conjunction with a face recognition-based response to a challenge posed to a user being authenticated, such as a challenge to get information from the user being authenticated in order to authenticate the user. In certain embodiments, based upon a series of captured image frames (e.g., from a video stream captured by a camera) of a person's face, one or more types of facial motion characteristics, such as eye blinking, mouth movement during smiling, and head rotation, may be detected. One or more of the facial motions may then be used to accurately determine the liveness of the face. Moreover, no pre-existing model or pre-training is needed for the detection.

In certain embodiments, the liveness detection technique receives sequence of image frames (e.g., a time series of image frames) depicting a person's face as input. Additional information associated with the image frames (e.g., coordinates of feature points related to facial features in the image frames) may be received or determined from the sequence of image frames. The input set of image frames may be filtered to remove "invalid" frames that could potentially introduce an error in the liveness determination. For example, image frames that indicate a rotation or velocity of the movement of the face beyond certain thresholds may be removed as invalid. The remaining valid image frames (or some feature points on the valid image frames) may be normalized to facilitate frame comparisons. One or more liveness detection techniques as described herein, or any combination of the liveness detection techniques may then be applied to the valid and normalized image frames (or the normalized feature points on the valid image frames) to determine liveness of the face depicted in the valid image frames.

In certain embodiments, the liveness detection processing includes detecting eye blinks in the sequence of valid image frames. The eye blinks may be determined based upon a change in the opening area of the eye (e.g., defined by a polygon or other shape using extracted feature points in an image frame) and/or based upon multiple angles associated with the eye depicted in the set of valid image frames. For example, the change in the sum of the angles at two ends of the eye in the image frames determined using the feature points for the image frames may be used to identify a blinking action. As part of this processing, a closity value may be determined for each image frame based upon the angle analysis and/or opening area analysis of the eye in that image frame. Closity values for consecutive image frames may then be compared to determine transitions between different states of the eye (e.g., an OPEN state, a CLOSING state, a CLOSED state, and an OPENING state). Eye blinks may then be detected based on these transitions. In some implementations, a total number of eye blinks during a certain time period may be compared against a threshold value to determine whether the detection of the liveness of the face captured in the image frames is successful (i.e., deemed to be a live face) or not. For example, in one embodiment, if more than 10 blinks are detected within 2 minutes, then the face is deemed to be a live face.

The facial liveness detection may also be based upon detecting a smile in the set of valid image frames. For example, certain parameters associated with the mouth depicted in these image frames, such as the total height of the mouth, width-to-height ratio, opening height, area of opening of the mouth, etc., may be measured or calculated. The measured or calculated parameter values may be compared across a series of image frames to identify changes in these parameters. Based upon the changes in these parameters across the series of valid image frames, a determination can made regarding whether the user being authenticated is smiling.

The liveness detection may also be based upon detecting head motions and/or positions in the set of valid image frames. For example, the angle of rotation of the head (e.g., yaw, pitch, or roll) in response to an instruction may be determined based on the feature points in the series of image frames and used for liveness detection.

In embodiments where multiple liveness detection techniques are used, the liveness determination results from each of the techniques may then be combined to determine an overall liveness determination. For example, in one embodiment, the overall liveness determination may indicate that the face is a live face only if all the liveness determination results from the multiple liveness detection techniques (e.g., a Boolean AND condition) indicate that the face is a live face. In alternative embodiments, different combinations of the individual liveness detection results may be used to arrive at the overall liveness determination. Such a combination of multiple liveness detection techniques provides a more accurate, robust, and more confident determination of whether the face captured in the image frames is live.

FIG. 1 is a simplified block diagram of an example system 100 that enables face-based user authentication according to certain embodiments. System 100 may include one or more servers 110 that can communicate with one or more user devices 120. In certain embodiments, user devices 120 may be communicatively coupled with server(s) 110 via one or more communication networks (not shown). Examples of communication networks include, without restriction, the Internet, a wide area network (WAN), a local area network (LAN), an Ethernet network, wireless wide-area networks (WWANs), wireless local area networks (WLANs), wireless personal area networks (WPANs), a public or private network, a wired network, a wireless network, and the like, and combinations thereof. Different communication protocols may be used to facilitate the communications including both wired and wireless protocols such as IEEE 802.XX suite of protocols, TCP/IP, IPX, SAN, AppleTalk®, Bluetooth®, InfiniBand, RoCE, Fiber Channel, Ethernet, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), and others. A WWAN may be a network using an air interface technology, such as, a code division multiple access (CDMA) network, a Time Division Multiple Access (TDMA) network, a Frequency Division Multiple Access (FDMA) network, an OFDMA network, a Single-Carrier Frequency Division Multiple Access (SC-FDMA) network, a WiMax (IEEE 802.16), and so on. A WLAN may include an IEEE 802.11x network (e.g., a Wi-Fi network). A WPAN may be a Bluetooth network, an IEEE 802.15x, or some other types of network.

System 100 depicted in FIG. 1 is merely an example and is not intended to unduly limit the scope of inventive embodiments recited in the claims. One of ordinary skill in the art would recognize many possible variations, alternatives, and modifications. For example, in some implementations, system 100 may have more or fewer systems than those shown in FIG. 1, may combine two or more systems, or may have a different configuration or arrangement of systems.

User device 120 may sometimes be referred to as a client device, or simply a client. One or more applications ("apps"), such as a user app 1 (132), a user app 2 (134) may be hosted and executed by user device 120. The apps may be web browser-based applications or installable mobile device applications. The applications may allow user(s) to interact with service provider computer(s) to, for example, access web content (e.g., web pages, music, images, videos, files, databases, etc.).

User device 120 may be a computing device, such as, for example, a mobile phone, a smart phone, a personal digital assistant (PDA), a tablet computer, an electronic book (e-book) reader, a gaming console, a laptop computer, a netbook computer, a desktop computer, a thin-client device, a workstation, etc.

A user application, such as user app 1 (132) or user app 2 (134), may use face authentication to authenticate a user of user device 120. For example, an application may require a user to be authenticated using face authentication before the user application can execute the application, login to the application, use some protected resource of the application, etc. In certain embodiments, an authentication subsystem 126 is provided for reliably performing face authentication using one or more liveness detection techniques described in this disclosure. For example, when an application needs to perform face recognition based authentication, the application may request the services of authentication subsystem 126. Authentication subsystem 126 may then perform the face recognition analysis and determine liveness for the user's face. Authentication subsystem 126 may then communicate the liveness determination results (e.g., whether or not authentication subsystem 126 determines that the face used for authentication is a live face) to the requesting application. The requesting application may then authenticate the user based upon the liveness determination results. In certain embodiments, authentication subsystem 126 may provide face recognition and liveness determination services to multiple applications, such as to user app 1 (132), user app 2 (134), and the like. In certain embodiments, authentication subsystem 126 may be a part of user app 1 (132), user app 2 (134), or the like.

Authentication subsystem 126 may be implemented in software, hardware, firmware, or any combination thereof. For example, in one embodiment, authentication subsystem 126 may be a software application running on a general-purpose processing unit (e.g., a processor or core) of user device 120. In certain embodiments, authentication subsystem 126 may include subsystems or modules for performing various functions. In the embodiment depicted in FIG. 1, authentication subsystem 126 includes a face verification module 128 and a liveness detection module 130. Face verification module 128 may be configured to verify that the face of the user trying to access the user application matches the face of an authorized user that the user being authenticated claims to be. Liveness detection module 130 may be configured to verify that the face of the person being used for the face recognition is indeed a live face and is not, for example, a still face image being used to spoof the face recognition. Authentication subsystem 126 depicted in FIG. 1 is merely an example and is not intended to unduly limit the scope of inventive embodiments recited in the claims. One of ordinary skill in the art would recognize many possible variations, alternatives, and modifications. For example, in some implementations, authentication subsystem 126 may have more or fewer subsystems than those shown in FIG. 1, may combine two or more subsystems, or may have a different configuration or arrangement of subsystems.

In certain embodiments, upon receiving a request to perform face recognition and liveness determination, authentication subsystem 126 may use the services of image capture app 124 on user device 120 to capture a sequence of image frames of the face of the person being authenticated, which may be a user of user device 120. Image capture app 124 may, in turn, use image capture subsystem 122 to capture a time series of still image frames of the face of the person being authenticated. For example, image capture subsystem 122 may comprise a camera, which when activated by image capture app 124, is configured to capture a video of the person's face, the video comprising a sequence of image frames. In some embodiments, a message may be displayed to the user via user device 120 instructing the user to look at the camera while the video is being captured. The captured series of image frames by image capture app 124 may be sent to authentication subsystem 126 for processing.

Authentication subsystem 126 may perform face verification (may be performed by face verification module 128) based upon the captured image frames to determine whether the face represented by the image frames matches the valid user's reference facial image. Reference facial images may be stored in a memory store that is accessible by authentication subsystem 126. In some embodiments, the reference facial images may be stored in a security store on a server accessible by authentication subsystem 126.

In some embodiments, the reference facial images may be stored by a social networking system. For example, a social networking system may store information for users of the social networking system in the form of user profiles, which may include images of the users. These images may be used as reference images. A social networking system allows users to communicate and exchange information with other users. In some embodiments, the information that is communicated or exchanged between users may include images of users. These images may also be used as reference facial images in certain embodiments for performing face verification.

If the person was not successfully verified, then authentication subsystem 126 may send a message to the requesting application indicating that user verification failed. If face verification module 128 determines that the face in the captured image frames matches the claimed valid user's reference facial image, i.e., the user is successfully verified, then authentication subsystem 126 may perform liveness detection using liveness detection module 130 as described in detail below. Authentication subsystem 126 may then communicate results of the liveness determination to the requesting application. The requesting application may then perform user authentication based upon the results received from authentication subsystem 126, and/or, for example, password-based authentication results.

In certain implementations, the face verification and liveness detection may be performed in parallel by authentication subsystem 126. In some implementations, the face verification and liveness detection may be performed by authentication subsystem 126 with the assistance of server(s) 110. For example, authentication subsystem 126 may send the sequence of image frames of the face of the person being authenticated captured by image capture app 124 to server(s) 110 for validation and feature extraction, and receive valid image frames and/or extracted feature information for the valid image frames from server(s) 110. In some implementations, the face verification and the liveness detection may be performed by server(s) 110.

Server(s) 110 may include an image analysis subsystem 112. Image analysis subsystem 112 may be configured to receive a series of captured image frames (e.g., from authentication subsystem 126) and extract characteristics for the image frames. Extracting the characteristics may include extracting, for each image frame, feature points for a face present in the image frame. The feature points may relate to features or landmarks on the face present in the image frame, such as outer edges of the face, nose, eyes, mouth, ears, eyebrows, and other features of the face. Information regarding the feature points extracted by image analysis subsystem 112 may be sent to authentication subsystem 126 for use during facial liveness detection analysis. Various different ways may be used to communicate the feature points information to authentication subsystem 126. For example, the feature points information may be saved as metadata associated with the captured image frames, the feature points information may be saved as a separate file that is communicated to authentication subsystem 126, the image frames may be annotated with feature points information, and the like.

In some implementations, server(s) 110 may also include a face authentication subsystem 114. After the face verification and liveness detection performed on user device 120 indicate that the face of the user being authenticated matches the face of the claimed valid user and the face is a live face, authentication subsystem 126 may send at least a subset of the series of captured image frames (and/or the extracted feature points in metadata) to face authentication subsystem 114 on server(s) 110. Face authentication subsystem 114 may perform liveness detection and/or face verification using the subset of image frames (or the metadata or file associated with these image frames) to verify that the face verification and liveness detection results from authentication subsystem 126 are valid. This is done, for example, to protect against potentially fabricated results sent by an attacker to the server through an Application Program Interface (API). In some implementations, image analysis subsystem 112 and face authentication subsystem 114 may be on a same server 110. In some implementations, image analysis subsystem 112 and face authentication subsystem 114 may be on different servers 110.

In some embodiments, server(s) 110 may include a server of a social networking system that provides a platform that enables users of the social networking system the ability to communicate and interact with other users of the social networking system. Users may join the social networking system by opening an account with the social networking system. Users can then add connections to any number of other users of the social networking system to whom they desire to be connected. The term "friend" is sometimes used to refer to any other users of the social networking system to whom a user has formed a connection, association, or relationship via the social networking system. Connections may be added explicitly by a user or may be automatically created by the social networking system based on common characteristics of the users (e.g., users who are alumni of the same educational institution).

The social networking system stores information for its users. The social networking system may store information about its users including biographic, demographic, and other types of descriptive information, such as work experience, educational history, hobbies or preferences, location info, and the like that has been declared by users or inferred by social networking system. This information may be stored as user profiles in a user profile store where each user may be uniquely identified.

In some embodiments, the information may be stored as a graph (e.g., a data structure including edges and nodes). The graph may represent the social network of users of the social networking system and is sometimes referred to as a social graph. In one embodiment, if users of a social networking system are represented as nodes in the social graph, the term "friend" can refer to an edge formed between and directly connecting two user nodes.

A social networking system can facilitate linkages between a variety of entities, including users, groups, etc. These entities may be represented by nodes of the social graph interconnected by one or more edges. A node in the social graph may represent an entity that can act on another node representing another entity and/or that can be acted on by the entity corresponding to the another node. A social graph may include various types of nodes corresponding to users, non-person entities, content items, web pages, groups, activities, messages, concepts, and other things that can be represented by objects in a social networking system. An edge between two nodes in the social graph may represent a particular kind of connection, or association, between the two nodes, which may result from node relationships or from an action that was performed by an entity represented by one of the nodes on an entity represented by the other node. In some cases, the edges between nodes may be weighted. In certain embodiments, the weight associated with an edge may represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system modifies edges connecting the various nodes to reflect the relationships and interactions.

A social networking system also includes user-generated content, which may include anything a user can add, upload, send, or "post" to the social networking system to be shared with other users. This user-generated content may include textual data, location information, images (e.g., photos), videos, links, music, or other similar data and/or media. Content "items" may be represented as objects within the social networking system.

In certain embodiments, a user photo stored as part of the user's profile or stored as part of user-generated content may be used as a reference photo for performing face verification as described above. For example, face verification module 128 depicted in FIG. 1 may access such a reference photo from information stored by the social networking system and determine if the face included in the captured image frames matches the face in the reference photo.

A social networking system can include one or more computing systems. The social networking system may include an authorization server that enforces one or more privacy settings for users of the social networking system. A privacy setting of a user determines how particular information associated with a user can be shared. For example, a privacy setting for a user may specify particular information associated with a user (e.g., account or profile information or portions thereof such as photos, phone numbers, connections, etc.) and specify one or more entities (e.g., users, applications, external systems) with whom the information can be shared. Privacy settings may be specified at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. For example, a user may specify that the user's personal information may be shared with immediate friends whereas the user's work information may be shared with friends and also with friends of friends. The authorization server implements logic to determine if certain information associated with a user can be accessed by a user's friends, external systems, and/or other applications and entities.

In some embodiments, at least one app on user device 120 may be a social networking app. When a user starts the social networking app, the social networking app (or the authorization server of the social networking system through the social networking app) may initiate an authentication of the user using, for example, authentication subsystem 126 on user device 120. The user may not be able to use any or some features of the social networking app before the user is successfully authenticated.

Figure 2:
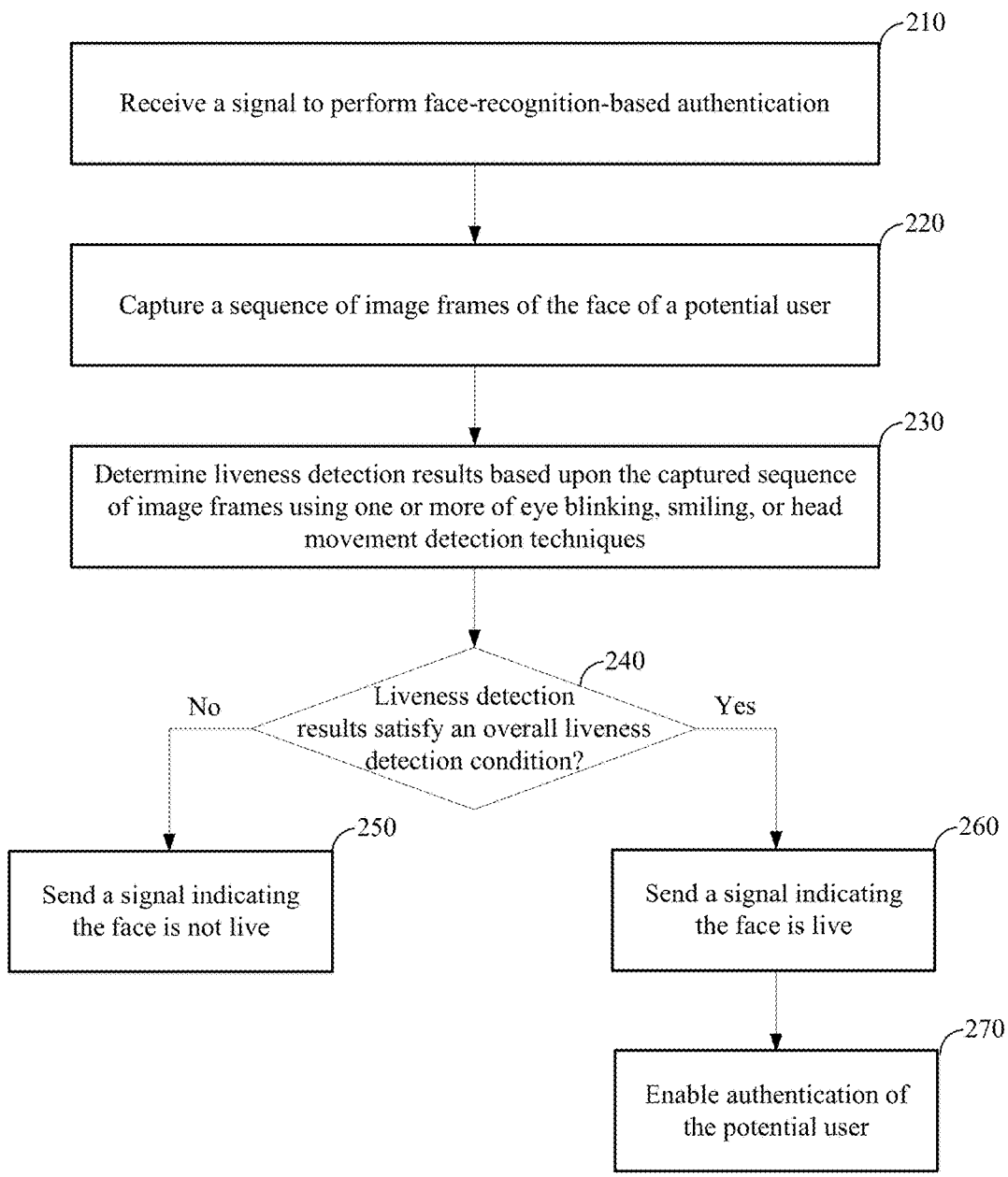
FIG. 2 is a simplified flow chart illustrating an example method for performing liveness detection as part of face-based authentication according to certain embodiments.

FIG. 2 is a simplified flow chart 200 illustrating an example method for performing liveness detection as part of face-based authentication according to certain embodiments. The processing depicted in FIG. 2 may be implemented in software (e.g., code, instructions, program) executed by one or more processing units (e.g., processors, cores) of a computing system, hardware, or combinations thereof. The software may be stored on a non-transitory storage medium (e.g., on a memory device). The method presented in FIG. 2 and described below is intended to be illustrative and non-limiting. The particular series of processing steps depicted in FIG. 2 is not intended to be limiting. Although FIG. 2 depicts the various processing steps occurring in a particular sequence or order, this is not intended to be limiting. In certain alternative embodiments, the steps may be performed in some different order or some steps may also be performed in parallel. In certain embodiments, such as the embodiment depicted in FIG. 1, the processing depicted in FIG. 2 may be performed by authentication subsystem 126 of FIG. 1, alone or in combination with, for example, image capture subsystem 122, image capture app 124, and/or image analysis subsystem 112.

As described above, face authentication performed by authentication subsystem 126 involves face verification and liveness detection. The flowchart depicted in FIG. 2 and the associated description below focuses on the liveness detection processing and does not describe face verification. As described above, authentication subsystem 126 may also perform face verification prior to or in parallel with liveness detection processing.

At 210, authentication subsystem 126 may receive a signal or a request to perform face-recognition-based user authentication. As described above, the signal or request may be received from a user application, such as user app 1 (132) or user app 2 (134). The application may send the request to authentication subsystem 126 when a user tries to access or log into the user application, tries to access some protected resource or content (e.g., requests access to particular web content such as web pages, music, images, videos, files, databases, etc., or any secure information), attempts to perform a restricted or protected function, etc. In some implementations, a message or prompt may be displayed on a user interface of the user device to indicate that the user authentication is in progress and may instruct the user to face a camera on the user device or making some facial motions (e.g., smiles or rotations).

At 220, a sequence of image frames of the user's face are captured. For example, as described above, authentication subsystem 126 may use the services of image capture app 124 on user device 120 to capture a sequence of image frames of the user's face. Image capture app 124 may, in turn, use image capture subsystem 122 to capture a time series of still image frames of the face of the person being authenticated. For example, image capture subsystem 122 may comprise a camera, which when activated by image capture app 124, is configured to capture a video of the user's face, the video comprising a sequence of image frames. The sequence of image frames may be captured at a particular frame rate, such as, for example, about 15 frames per second (fps), 25 fps, 30 fps, 60 fps, or faster, in order to capture the facial motions. The image frames may be saved as still images or as frames in a video file.

At 230, the authentication subsystem may determine liveness detection results based upon the captured sequence of image frames, using one or more of eye blinking, smiling, or head movement-based detection techniques. In some implementations, the liveness detection may include pre-processing the captured sequence of image frames, such as extracting feature points in the image frames, removing or labeling invalid image frames, or normalizing the image frames (or feature points on the valid image frames). The valid and normalized image frames (or the normalized feature points on the valid image frames) may then be used to detect facial motions, such as eye blinks, smiles, and/or head movement. Example operations at 230 are described in detail below with respect to FIG. 3.

At 240, the authentication subsystem may determine whether the liveness detection results satisfy an overall liveness detection condition. In some implementations, the overall liveness detection condition may be determined based on one type of facial motion, such as eye blinks, and the face may be determined to be live if a criterion of the type of facial motion (e.g., the number of eye blinks in a certain time period) is satisfied. For example, in one example, the face may be determined to be live if more than 15 eye blinks are detected in 3 minutes. In some implementations, the overall liveness detection condition may be determined based on the combination of the detection results using two or more types of facial motion, and the face may be determined to be live if two or more criteria each for a type of facial motion are satisfied.

As described above, in some implementations, after the face verification and liveness detection performed on user device indicate that the face of the user being authenticated matches the face of the claimed valid user and the face of the user being authenticated is live, the authentication subsystem on the user device may send at least a subset of the series of image frames or the extracted feature points in metadata or separate files to a face authentication subsystem on a remote server. The face authentication subsystem on the remote server may perform liveness detection and/or face verification using the subset of image frames (or the metadata or file associated with these image frames) to verify that the authentication results from authentication subsystem on the user device are valid, rather than fabricated results sent by an attacker to the server through an API. The face authentication subsystem on the remote server may use similar or different liveness detection techniques as the authentication subsystem on the user device. For example, in some implementations, the user device may use one or more of the liveness detection techniques described above, and the remote server may use one or more of the liveness detection techniques described above but different from the liveness detection techniques used on the user device. The results from the face authentication subsystem on the remote server may be sent back to the authentication subsystem on the user device. The results from the face authentication subsystem on the remote server may indicate success or failure of the face-based authentication, and, in case of failure, a reason for the failure. The results from the face authentication subsystem on the remote server may be used with or as a part of the overall liveness detection condition at 240 to determine the liveness of the face.

At 250, in response to determining that the liveness detection results do not satisfy (or fail) the overall liveness detection condition at 240, the authentication subsystem may send a signal to the application that requests the user authentication to indicate that the face may not be live.

At 260, in response to determining that the liveness detection results satisfy the overall liveness detection condition at 240, the authentication subsystem may send a signal to the user application that requests the user authentication to indicate that the face is live.

At 270, the authentication subsystem may enable authentication of the user such that the user may be able to use the requested user application. In some implementations, the authentication subsystem may enable a remote server to authenticate the user or verify the result of authentication of the user by the authentication subsystem on the user device.

Figure 3:
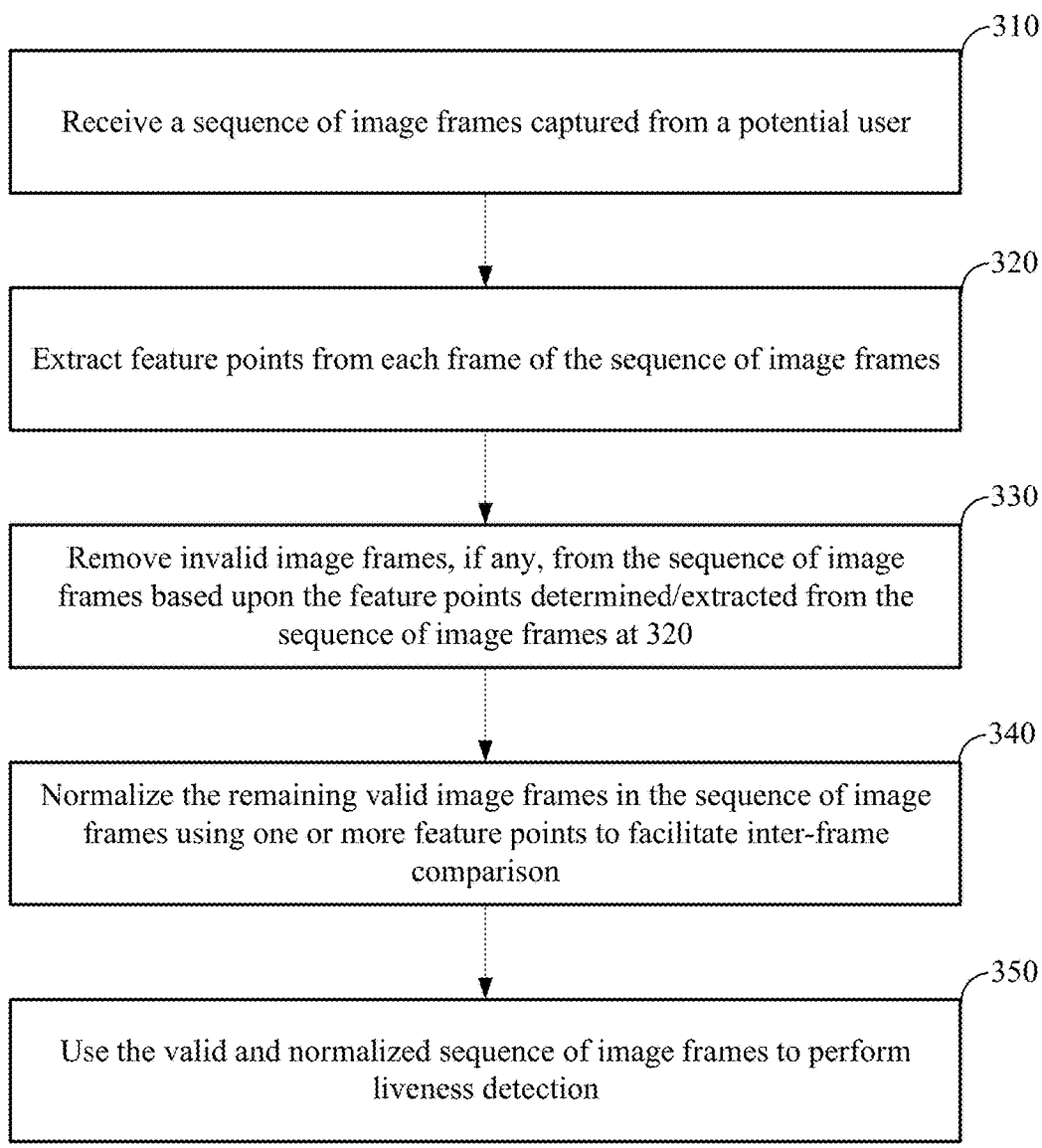
FIG. 3 is a simplified flow chart illustrating an example method of preparing image frames for liveness detection according to certain embodiments.

FIG. 3 is a simplified flow chart 300 illustrating an example method of preparing image frames for liveness detection according to certain embodiments. The method may be performed by, for example, authentication subsystem 126, alone or in combination with, for example, image capture app 124 and/or image analysis subsystem 112 of FIG. 1.

At 310, the authentication subsystem may receive a captured sequence of image frames of the face of the user being authenticated from, for example, image capture app 124. The sequence of image frames may be captured by an image capture subsystem, such as a camera, as described above in 220 of FIG. 2.

At 320, the authentication subsystem or an image analysis subsystem (e.g., image analysis subsystem 112) may extract feature points from each image frame of the sequence of image frames. The feature points may relate to features (e.g., landmarks) on the face present in the image frames, such as edges of the face, nose, eyes, mouth, ears, and eyebrows of the user being authenticated. Various techniques may be used to extract facial feature points, such as, for example, using Parameterized Appearance Models (PAMs) (e.g., Active Appearance Models (AAMs) or Morphable Models), discriminative method to fit AAMs, elastic graph matching, or supervised descent method (SDM). In one example, a cascaded tree regression technique may be used for, for example, face detection, facial features alignment and extraction, 3-D mesh reconstruction/fitting, and inter-frame tracking. Facial features may be extracted for each image frame. The facial features may be represented by 2-D or 3-D feature points, which may be described by 2-D or 3-D coordinates and saved in the metadata of (or a separate file associated with) the image frame. The feature points may also be annotated on the image frame.

Figure 4:
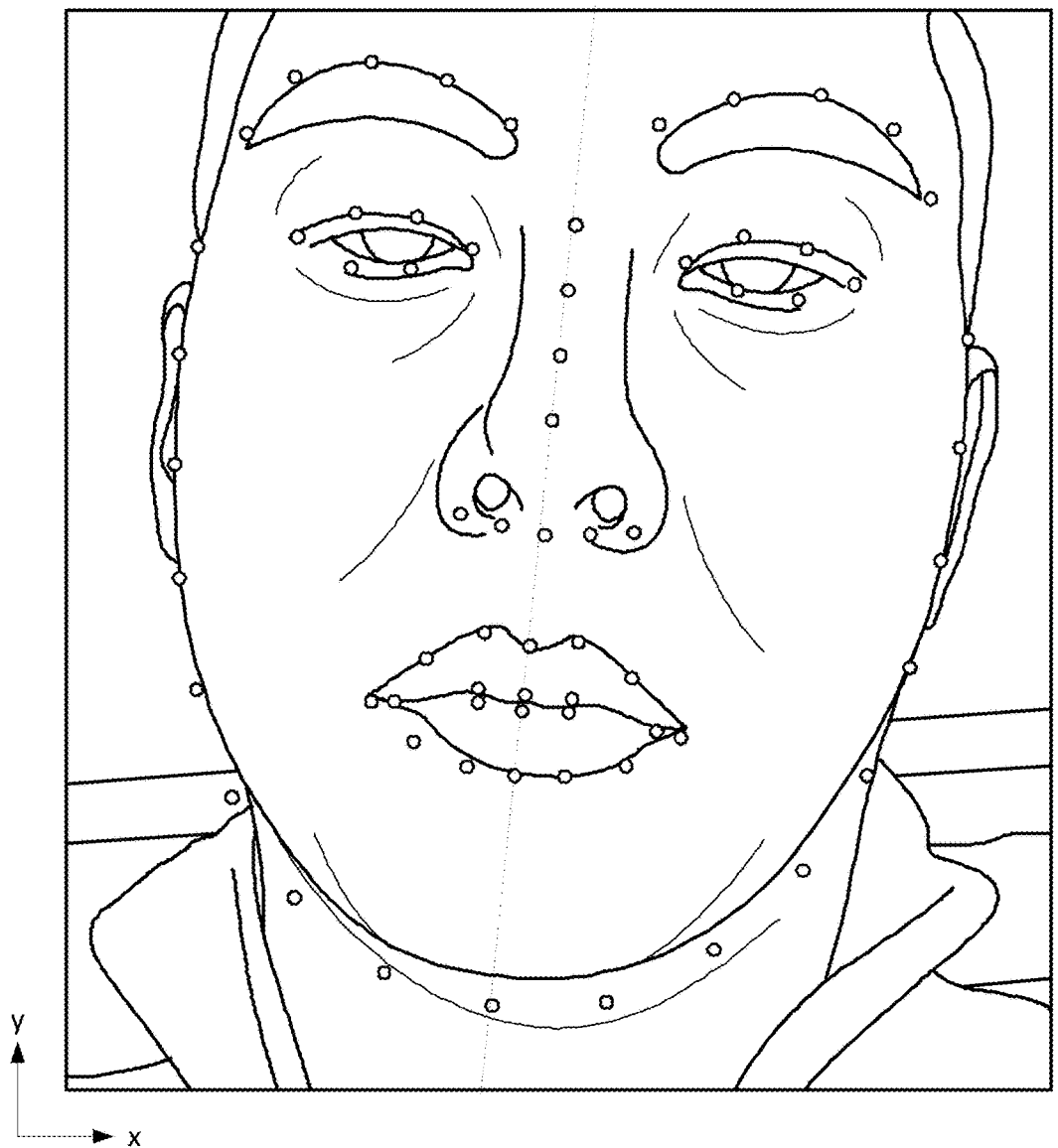
FIG. 4 illustrates an example image frame of a face of a subject showing extracted feature points according to certain embodiments.

FIG. 4 illustrates an example image frame 400 of a face of a subject annotated with extracted feature points according to certain embodiments. As shown in FIG. 4, the edge of the face, the mouth, the nose, the eyes, and the eyebrows of the subject may each be represented by multiple feature points. In example image frame 400 shown in FIG. 4, the edge of the face may be represented and described by 17 feature points, the mouth may be represented and described by 20 feature points, the nose may be represented and described by 9 feature points, each eye may be represented and described by 6 feature points, and each eyebrow may be represented and described by 5 feature points. Thus, in one non-limiting embodiment, a total of 68 feature points may be used to represent and describe the landmarks or features of a face in an image frame. Each feature point may be assigned a unique identification number, and the coordinates of each feature point may be saved to a table or a file, or saved as metadata associated with the image frame. Information regarding the feature points extracted from each image frame, such as the table, file, or metadata including the coordinates of the feature points, and/or the annotated image frame, may be sent to the authentication subsystem for facial liveness detection and/or authentication.

Referring back to FIG. 3, at 330, the authentication subsystem or the image analysis subsystem may remove invalid image frames, if any, from the sequence of image frames, based upon the feature points determined/extracted from the sequence of image frames in 320. For example, the feature points extracted from the image frames may be used to generate information regarding the rotation of the face with respect to the xyz axes (i.e., pitch, yaw and roll). In some implementations, an image frame may be deemed invalidate when the rotation angle of the face in the image frame exceeds a corresponding threshold. For example, if the face in the image frame is rotated more than 10 degrees in any of pitch, yaw, and roll relative to, for example, the face in an image frame in which the subject faces the camera directly and straightly, the image frame may be invalid for liveness detection. This may help to ensure that the information regarding the extracted feature point is accurate as the feature extraction technique may be most accurate when the rotation angle is no greater than a threshold value, such as 10 degrees. This may also help to filter out image frames captured when a user being authenticated attempts to spoof liveness detection by rotating or moving still images. In some implementations, the linear or angular velocity of the rotation of the face may be calculated based on the change of the locations of one or more feature points (e.g., the tip (apex) of the nose, center of an eye, a corner or center of the mouth) in consecutive image frames and the image frame capturing rate. When, for example, the linear velocity of the movement of the tip of the nose in an image frame exceeds a threshold value (e.g., about 300 pixels/second) with respect to a previous image frame, the image frame may be invalid for liveness detection. The invalid image frames may be labeled or removed so that the information associated with the invalid image frames may not be used for liveness detection.

At 340, the authentication subsystem or the image analysis subsystem may normalize the remaining valid image frames (or the feature points on the valid image frames) in the sequence of image frames using one or more feature points, in order to facilitate inter-frame comparison. During the capturing of the sequence of image frames, the user being authenticated may rotate the head and/or move farther or closer to the camera. Therefore, the orientation of the face and/or the size of the face in an image frame may vary from frame to frame. A normalization process thus may include rotating and/or zooming the image frames (or feature points on the image frames) such that the orientation and magnification ratio of the face are consistent in the sequence of image frames, which may facilitate the comparison of the image frames for facial motion detection. Example operations at 340 are further described below in detail with respect to, for example, FIGS. 5A, 5B, 6, and 7.

At 350, the authentication subsystem may use the valid and normalized sequence of image frames (or the normalized features points on th valid image frames) for liveness detection, based on one or more types of facial motion present in the sequence of image frames, such as eye blinks, smiles, and head rotations. Example operations at 350 are further described in detail below with respect to, for example, FIGS. 8-14.

As discussed above, while the sequence of image frames are being captured, the user may rotate head and/or move farther or closer to the camera. Therefore, the orientation of the face and/or the size of the face in the image frame may vary from frame to frame. As such, comparing the feature points extracted from multiple frames directly to determine the liveness of the face based on, for example, an opening area of the eye, may be error-prone because the face may be rotated or tilted, and/or zoomed in or out between frames. In some implementations, a two-step normalization process may be performed to rotate the image frame (when needed) so that the face is in the same orientation, and to scale the image frame so that the feature points may occupy an area having a same size across the sequence of image frames.

Figure 5B:
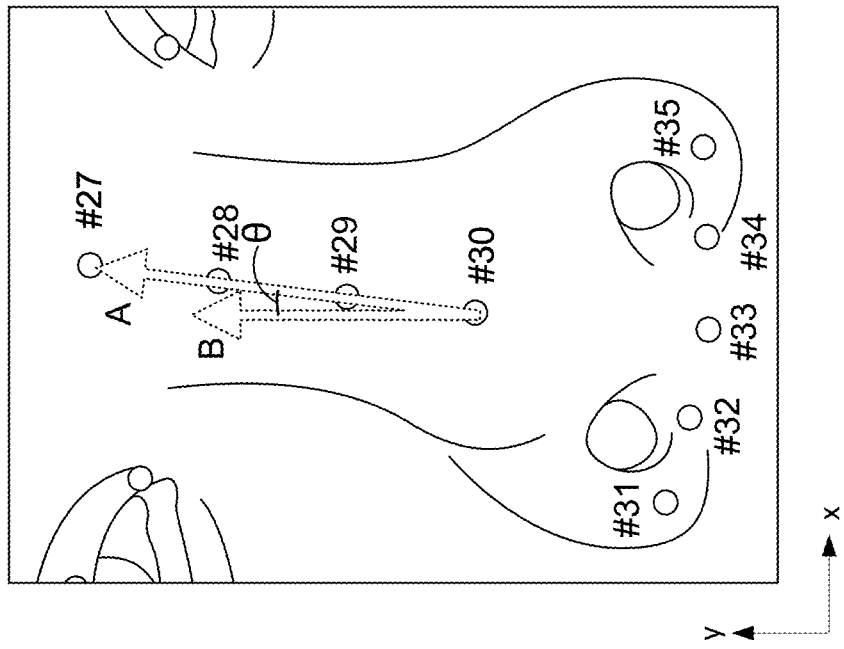
FIG. 5B illustrates an example image frame of a face of a subject showing the angle of rotation for image alignment according to certain embodiments.
Figure 5A:
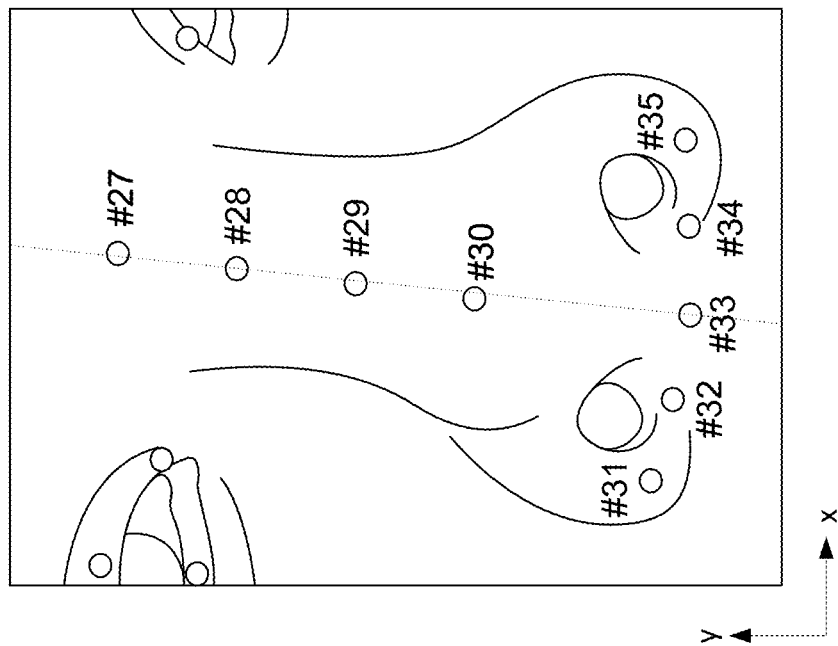
FIG. 5A illustrates an example image frame of a face of a subject showing extracted feature points for image alignment according to certain embodiments.

FIG. 5A illustrates an example image frame 500 of a face of a subject showing extracted feature points according to certain embodiments. In FIG. 5, feature points associated with a nose of a subject may include a set of feature points #27-#30 on the nose bridge (i.e., dorsum) and a set of feature points #31-#35 at the base of nose. As shown in FIG. 5A, the nose bridge of the subject in image frame 500 is not aligned with the y-axis or perpendicular to the x-axis of image frame 500, where the x-axis of the image frame may be parallel to the floor if the camera on the user device is aligned with the floor. An angle of rotation for aligning the image may be calculated based on, for example, a vector formed by feature point #27 (which may be at the root of the nose) and feature point #30 (which may be at the tip of the nose).

FIG. 5B illustrates an example image frame 550 of the face of the subject showing the angle of rotation for image alignment according to certain embodiments. A vector A may be formed by connecting feature point #30 (e.g., at the tip of nose) and feature point #27 (e.g., at the root of nose). A vector B may represent or align with the y-axis of the image frame. The angle θ between vector A and vector B may indicate the desired angle of rotation of the feature points in image frame 500 with respect to a reference point, such as feature point #30. All other feature points extracted from the image frame may then be rotated by angle θ with respect to the reference point, to remove the rotational variations in the feature points between image frames caused by rotations of the head, thus making inter-frame comparisons more reliable.

Figure 6:
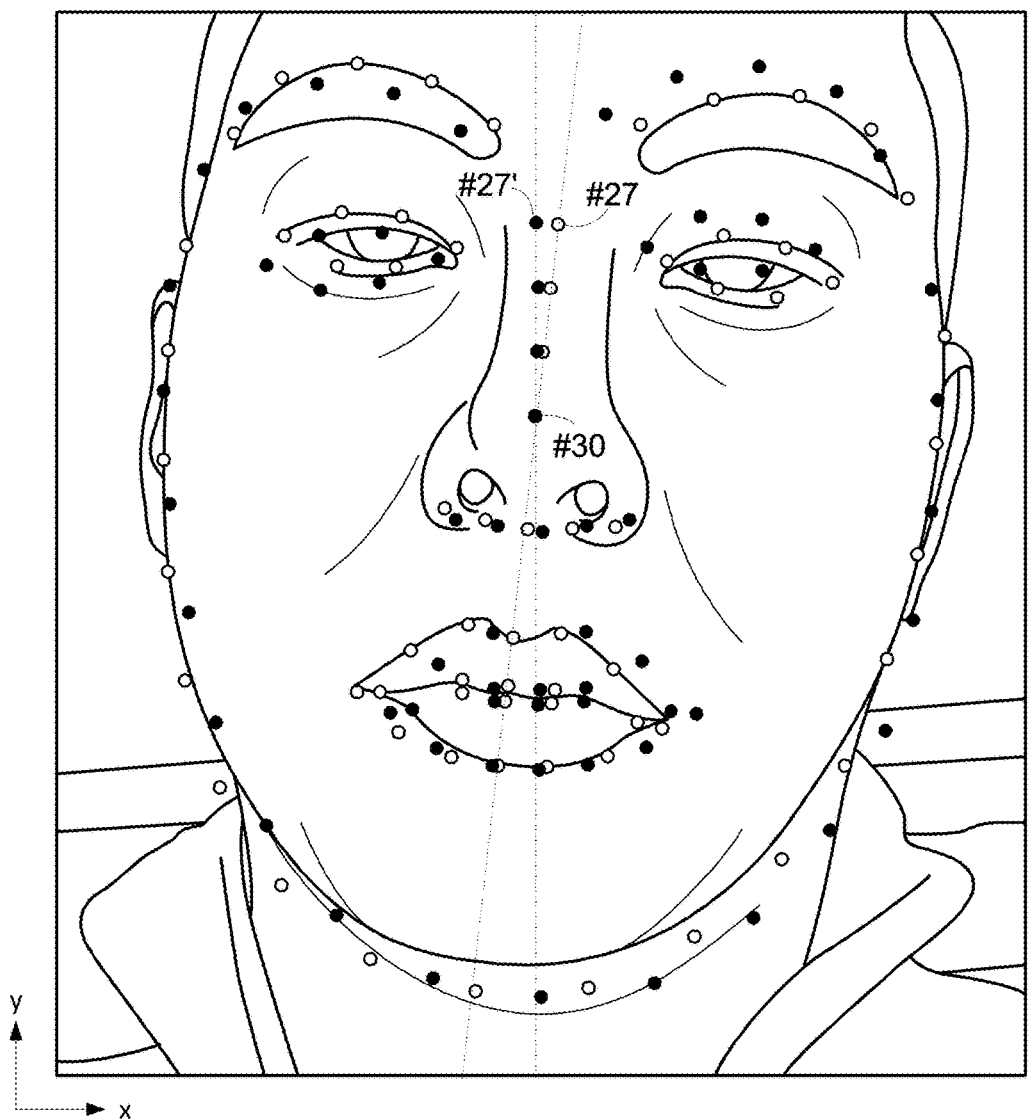
FIG. 6 illustrates an example image frame of a face of a subject depicting extracted feature points aligned with respect to an axis of the image frame according to certain embodiments.

FIG. 6 illustrates an example image frame 600 of a face of a subject depicting extracted feature points aligned with respect to an axis of the image frame according to certain embodiments. In FIG. 6, all extracted feature points (represented by circles) are rotated counter-clockwise by an angle, such as angle θ determined from FIG. 5, with respect to feature point #30. The resultant feature points are represented by the black dots. For example, feature point #27 may be moved to a new location represented by feature point #27', while feature point #30 may not be moved. As such, each feature point, except the reference point (i.e., feature point #30), may have new x-y coordinates. After the rotation, a new table, file, or metadata may be generated for the image frame based on the new x-y coordinates of the feature points. A person skilled in the art would understand that, even though FIG. 6 illustrates rotating the feature points with respect to the tip of nose (feature point #30), other reference points, such as, for example, the root of nose, the center of eye, the philtrum, or the origin of the image frame (with x-y coordinates of (0, 0)), may be used as the reference point for feature point rotation.

In some cases, additionally or alternatively, the feature points in the image frame may be scaled such that the feature points in each image frame may occupy an area having a same size across the sequence of image frames. For example, in each image frame, a minimum bounding box that includes all extracted feature points in the image frame (after a rotation if image alignment is performed) may be determined. The minimum bounding box may then be scaled to have a same area (or width or height) as the area (or width or height) of a minimum bounding box in a reference image frame. In some implementations, the x-y coordinates of the feature points may be shifted with respect to a reference point, such that the relative coordinates of the feature points with respect to the reference point (relative coordinates of (0,0)) may be determined. The reference point may be, for example, a corner or a center of the minimum bounding box.

Figure 7:
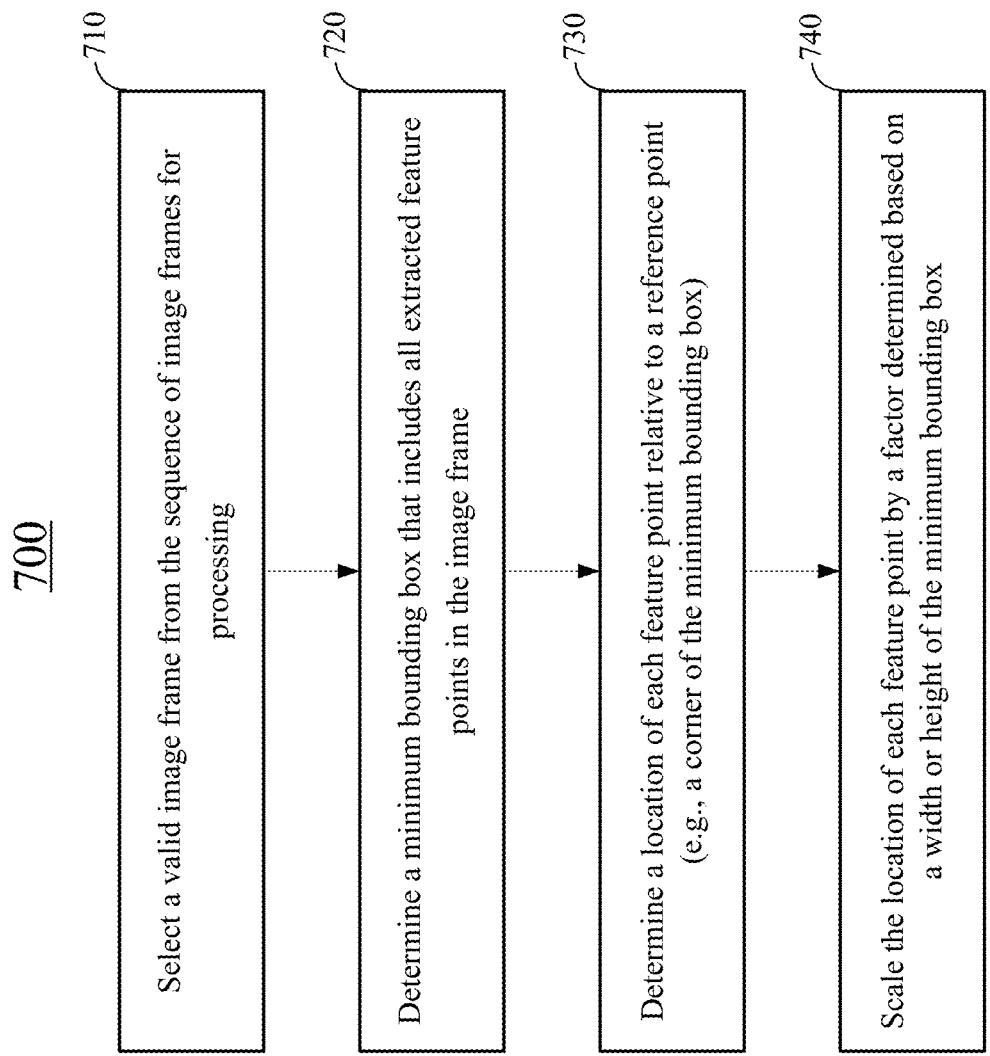
FIG. 7 is a simplified flow chart illustrating a method for scaling an image frame according to certain embodiments.

FIG. 7 is a simplified flow chart 700 illustrating a method for scaling an image frame according to certain embodiments. The method may be performed by, for example, authentication subsystem 126 of FIG. 1, alone or in combination with, for example, image analysis subsystem 112.

At 710, an authentication subsystem or image analysis subsystem may select a valid (and aligned) image frame from a sequence of valid (and aligned) image frames for processing.

At 720, the authentication subsystem or image analysis subsystem may determine a minimum bounding box, such as a rectangle, that includes all extracted (and rotated) feature points in the image frame. For example, the minimum and maximum coordinates of all feature points in the image frame in the x direction may be determined to be $X_{min}$ and $X_{max}$, respectively, and the minimum and maximum coordinates of all feature points in the image frame in the y-direction may be determined to be $Y_{min}$ and $Y_{max}$, respectively. A rectangle with four corners at $(X_{min}, Y_{min})$, $(X_{min}, Y_{max})$, $(X_{max}, Y_{max})$, and $(X_{max}, Y_{min})$ may be selected as the minimum bounding box, which may have a width of $X_{max}-X_{min}$ and a height of $Y_{max}-Y_{min}$.

In some implementations, at 730, the authentication subsystem or image analysis subsystem may determine the location of each feature point relative to a reference point, such as, a corner or a center of the minimum bounding box. For example, the corner of the minimum bounding box at $(X_{min}, Y_{min})$ may be used as the reference point (with relative coordinates of (0,0)), and a feature point with coordinates (x, y) may be shifted with respect to the reference point to have relative coordinates of $(x-X_{min}, y-Y_{min})$.

At 740, the authentication subsystem or image analysis subsystem may scale the location of each feature point by a factor determined based on, for example, a width or height of the minimum bounding box. For example, the relative coordinates of each feature point may be scaled by a factor of $1/(X_{max}-X_{min})$ or $1/(Y_{max}-Y_{min})$, such that the minimum bounding box may have two corners at (0, 0) and (1,0) (i.e., a width of 1), or may have two corners at (0, 0) and (0, 1) (i.e., a height of 1). The height and the width of the minimum bounding box may be scaled according to a same ratio to preserve the aspect ratio of the face. As such, each feature point with raw coordinates (x, y) may have normalized coordinates of $((x-X_{min})/(X_{max}-X_{min}), (y-Y_{min})/(X_{max}-X_{min}))$, or normalized coordinates of $((x-X_{min})/(Y_{max}-Y_{min}), (y-Y_{min})/(Y_{max}-Y_{min}))$. This may ensure that the feature points in each image frame will be in the same scale for inter-frame comparison. The normalized feature points in the sequence of valid and normalized image frames may then be used to more accurately detect facial motions, such as eye blinks, smiles, or head rotation.

In general, a spontaneous eye blink rate may be, for example, about 15-30 or fewer blinks per minute, which may vary depending on factors such as fatigue, stress, amount of sleep etc. In other words, a person's eyes may blink approximately once every 2-4 seconds or longer. An eye blink may last about 100 milliseconds (ms) to about 400 ms, and typically about 250 ms. Thus, if the image frame capturing rate is, for example, 25 fps, 30 fps, or higher, two or more frames (e.g., 6-8 or more image frames) may be captured during an eye blink. During other times, the eye may be in an OPEN state. Because eye blinks are spontaneous activities, liveness detection based on eye blinks may not require a user being authenticated to perform any additional action.

Figure 8:
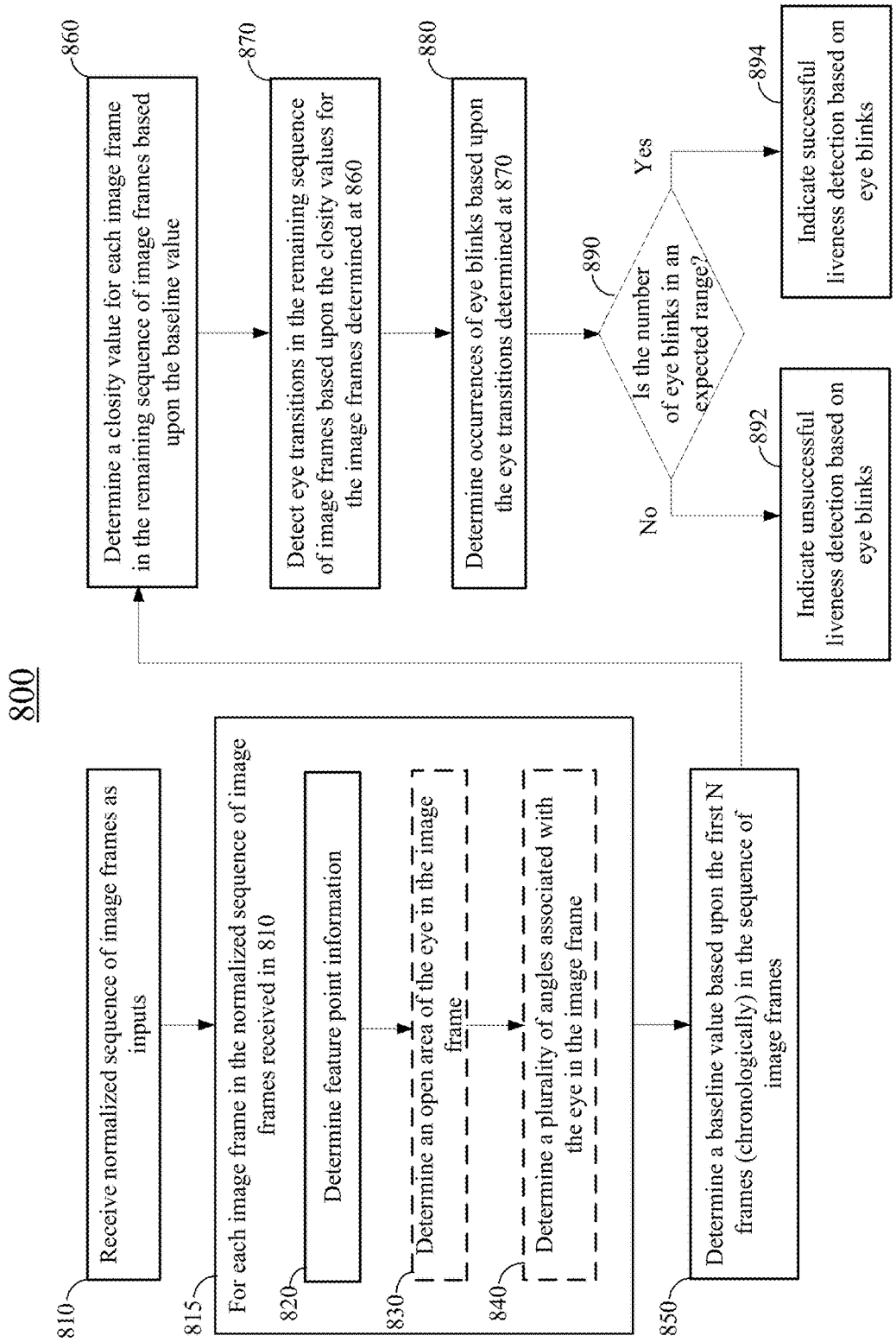
FIG. 8 is a simplified flow chart illustrating a method of liveness detection based on eye blinks according to certain embodiments.

FIG. 8 is a simplified flow chart 800 illustrating an example method of liveness detection based on eye blinks according to certain embodiments. The method may be performed by, for example, authentication subsystem 126 and/or face authentication subsystem 114 of FIG. 1. Eye blinks may be detected based on, for example, the changes in the opening area(s) of the eye(s), or the changes in one or more opening angles associated with one or more areas of the eye(s). The changes in the opening area(s) or opening angles of the eye(s) may indicate transitions in the state of the eye from an OPEN state to a CLOSING state, from a CLOSING state to a CLOSED state, from a CLOSED state to an OPENING state, or from an OPENING state to an OPEN state. An eye blink may be determined to have occurred if a sequential transition pattern of (OPEN→CLOSING→CLOSED→OPENING→OPEN) can be detected. The total number of eye blinks within a predetermined time period may be counted and compared against a threshold value to determine the liveness of the face presented in the image frames.

At 810, an authentication subsystem may receive a sequence of image frames as inputs. The sequence of image frames may be captured sequentially in time for a certain time period, such as, for example, 5 seconds, 10 seconds, 30 seconds, 1 minute, or longer. As described above, in some implementations, facial feature points may be extracted from each image frame, and may be used to validate and/or normalize each image frame (or feature points on each image frame). In some implementations, the facial feature point extraction may be performed after all image frames are captured. In some cases, the facial feature point extraction may be performed in parallel with image frame capturing. In some implementations, for example, when opening angles associated with the eye are used for liveness detection, image frame (or feature points) normalization may not be performed. As also described above, in some implementations, the authentication subsystem may receive image frames with annotated feature points described in metadata or in a file associated with the image frame. In some implementations, the authentication subsystem may only receive information regarding the image frames, rather than the image frames themselves. The information regarding an image frame may include, for example, a tag or label indicating that the image frame is valid or invalid, the relative or absolute timing information of the image frame, and the normalized 2-D coordinates of the feature points in the image frame. If an image frame is tagged as invalid, the authentication subsystem may not use that image frame for liveness detection.

At 815, for each image frame in the normalized sequence of frames received at 810, the authentication subsystem may perform the operations at 820-840. At 820, the authentication subsystem may determine the feature point information associated with, for example, the eyes on the face present in the image frame. The feature point information associated with the eyes may include, for example, the normalized x-y coordinates of the 6 feature points extracted for each eye as shown in FIG. 4.

In some embodiments, at 830, the authentication subsystem may determine an open area of the eye in the image frame based on the feature point information. For example, the six feature points extracted for each eye may be used to determine a shape, such as an oval or a polygon with some of the six feature points as the vertexes, that approximates the opening area of the eye. The area of the shape that approximates the opening area of the eye may be calculated and used to represent the opening area of the eye. In some implementations, the opening area of each of the two eyes may be determined and the sum of the opening areas of the two eyes may be used to represent the opening area of the eyes in the image frame. Because the image frame (or feature points on the image frame) may be normalized as described above, the relative value of the opening area may correlate with a closity value representing the extent to which the eye(s) are open or closed, even if the user being authenticated moves farther from or closer to the camera during the image frame capturing.

FIG. 9A illustrates an example image frame 900 showing extracted feature points associated with the eyes of a subject according to certain embodiments. As shown in FIG. 9A, each eye in image frame 900 may be represented by 6 feature points at the edges of the opening area of the eye.

FIG. 9B illustrates an example image frame 950 showing an opening area of an eye represented by a polygon according to certain embodiments. In the specific example shown in FIG. 9B, the opening area of the eye is approximated by a six-sided polygon 910, where each feature point of the six feature points is at a vertex of polygon 910. The area of polygon 910 may be calculated based on the relative coordinates of the feature points, for example, as a sum of the areas of four triangles. The opening area of the other eye may be similarly determined.

Referring back to FIG. 8, in some embodiments, at 840, the authentication subsystem may additionally or alternatively determine a plurality of angles associated with the eyes in the image frame. For example, the authentication subsystem may determine a first angle associated with a first area of the eye, and a second angle associated with a second area of the eye that is different from the first area. In some embodiments, a sum of the first angle and the second angle may be calculated as well. Unlike the opening area of the eye shown in FIGS. 9A and 9B, the plurality of angles and/or the sum of the plurality of angles of the eyes may be independent of the distance between the user and the camera or a scale of the image frame. Thus, the normalization process including orientation alignment and scaling may not be performed before the plurality of angles and/or the sum of the plurality of angles of the eyes are determined.

Figure 10A:
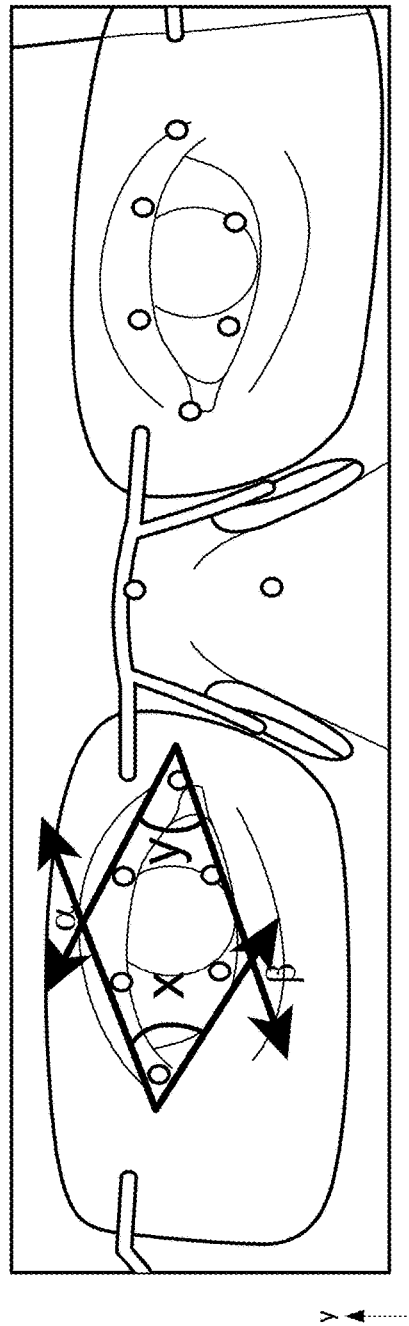
FIG. 10A illustrates an example image frame depicting the eyes of a subject in an OPEN state according to certain embodiments.

FIG. 10A illustrates an example image frame 1000 depicting the eyes of a subject in an OPEN state according to certain embodiments. As shown in FIG. 10A, each eye in image frame 1000 may be represented by 6 feature points at the edges of the opening area of the eye in the OPEN state. FIG. 10A also illustrates a first angle x corresponding to an opening angle at the left end of the eye in the OPEN state, and a second angle y corresponding to an opening angle at the right end of the eye in the OPEN state. The first angle may be determined based on, for example, the three feature points on the left side of the eye, and the second angle may be determined based on, for example, the three feature points on the right side of the eye. In other embodiments, the first angle and the second angle may be selected differently. For example, an opening angle $\alpha$ at the upper lash line or upper eyelid may be used as the first angle, and an opening angle $\beta$ at the lower lash line or lower eyelid may be used as the second angle, as illustrated in FIG. 10A.

Figure 10B:
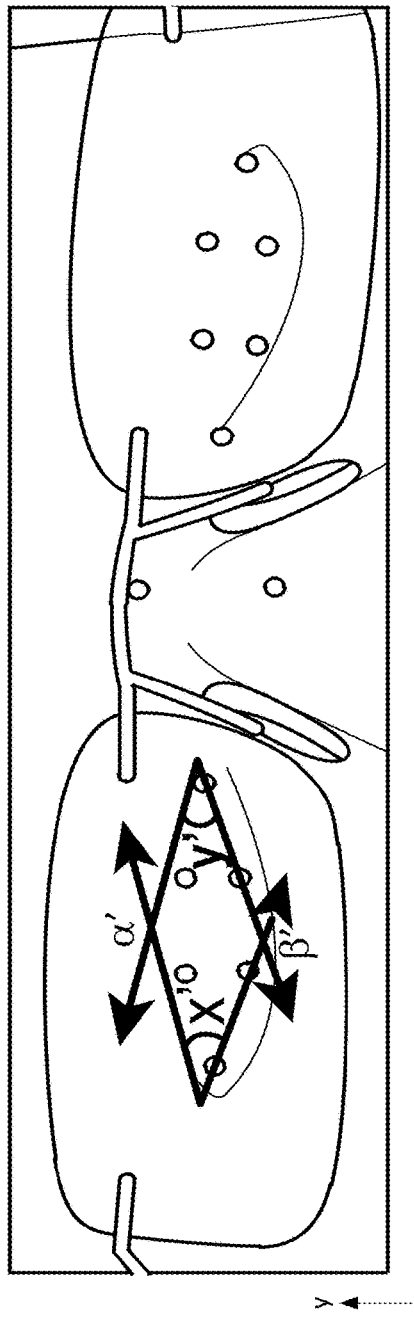
FIG. 10B illustrates an example image frame depicting the eyes of a subject in a CLOSED state according to certain embodiments.

FIG. 10B illustrates an example image frame 1050 depicting the eyes of a subject in a CLOSED state according to certain embodiments. As in image frame 1000, each eye in image frame 1050 may be represented by 6 feature points at the edges of the opening area of the eye. FIG. 10B illustrates a first angle x' representing an opening angle at the left end of the eye in the CLOSED state, and a second angle y' representing an opening angle at the right end of the eye in the CLOSED state. The first angle may be determined based on, for example, the three feature points on the left side of the eye, and the second angle may be determined based on, for example, the three feature points on the right side of the eye. In other embodiments, the first angle and the second angle may be selected differently. For example, an opening angle $\alpha'$ at the upper lash line or upper eyelid may be used as the first angle, and an opening angle $\beta'$ at the lower lash line or lower eyelid may be used as the second angle, as illustrated in FIG. 10B.

Referring back to FIG. 8 again, at 850, the authentication subsystem may determine a baseline value based upon the first N (chronological) image frames in the sequence of image frames. The first N image frames may be captured in a time period that is sufficient to capture an open eye, such as, for example, one or two seconds or longer. For example, the opening area of an eye or the sum of the opening areas of both eyes in each of the first 30 or 60 image frames (e.g., captured in a one-second or two-second time period) may be used to determine a maximum opening area of the eye of the user being authenticated as the baseline value. In another example, the sum of the plurality of angles (e.g., x+y or $\alpha+\beta$) of one eye or two eyes in each of the first 30 or 60 image frames (e.g., captured in a one-second or two-second time period) may be used to determine a maximum open angle value (e.g., x+y) of the eye(s) of the user being authenticated as the baseline value, or a minimum open angle value (e.g., α+β) of the eye(s) of the user being authenticated as the baseline value.

At 860, the authentication subsystem may determine a closity value representing the extent to which the eye(s) are open or closed for each image frame in the remaining sequence of image frames based upon the baseline value. For example, the closity value for each image frame may be determined by dividing the opening area of an eye or the sum of the opening areas of both eyes by the baseline value, or by dividing the sum of the plurality of angles (x+y or α+β) of one eye or two eyes by the baseline value. The closity value may be a normalized value based on the parameters of the open eye(s). The closity value may range from 0 to 1 or larger.

At 870, the authentication subsystem may detect eye transitions in the remaining image frames (starting from the (N+1)th image frame) of the sequence of image frames based upon the closity values for the image frames determined at 860. As described above, at a given time, the eye may be in any one of four states: an OPEN state, a CLOSING state, a CLOSED state, and an OPENING state. The transitions of the state of the eye may include a transition from the OPEN state to the CLOSING state, from the CLOSING state to the CLOSED state, from the CLOSED state to the OPENING state, and from the OPENING state to the OPEN state. In some implementations, depending on the image frame capturing rate, some states of the eye may not be captured, and thus some transitions may not be detected.

At 880, the authentication subsystem may determine the occurrences of eye blinks and count the number of eye blinks in a given time period based upon the eye transitions determined at 870. For example, an eye blink may be determined to have occurred if a sequential transition pattern of (OPEN→CLOSING→CLOSED→OPENING→OPEN) can be detected. The number of eye blinks within a time period, such as 5 seconds, 10 seconds, 30 seconds, one minute, or longer, may be determined. Examples of detecting eye transitions and eye blinks are described in detail below with respect to FIG. 11.

Figure 11:
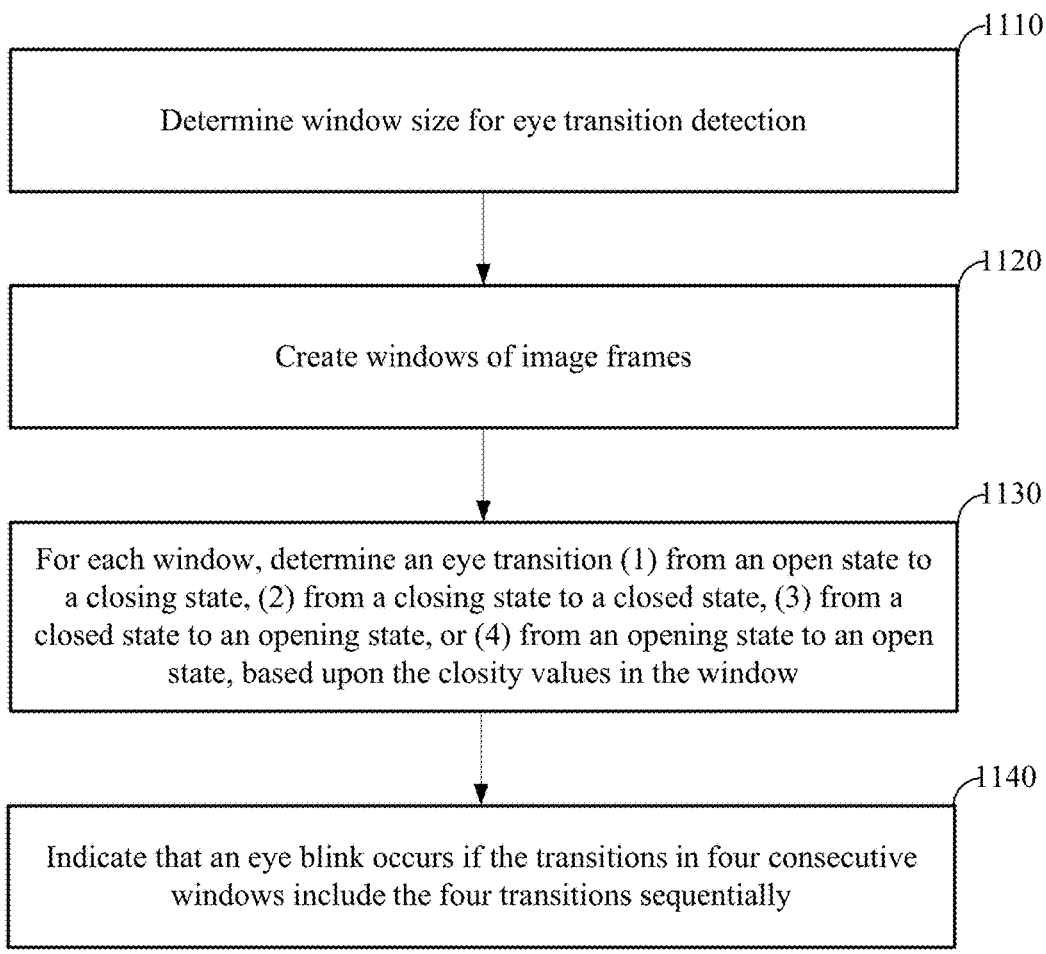
FIG. 11 is a simplified flow chart illustrating a method of facial liveness detection based on eye blinks according to certain embodiments.

FIG. 11 is a simplified flow chart 1100 illustrating a method of liveness detection based on eye blinks according to certain embodiments. The method may be performed by, for example, authentication subsystem 126 and/or face authentication subsystem 114 of FIG. 1. As described above with respect to 860, the authentication subsystem may determine or receive the closity value for each of the remaining image frames in the sequence of image frames. The closity values for the remaining image frames may be stored in, for example, a linear array, for liveness detection as described in detail below.

At 1110, the authentication subsystem may determine a window size M for eye transition detection using a sliding window of closity values determined at 860 as described above with respect to 830-860 and FIGS. 9A-9B and 10A-10B. In one example, a window size of 5 may be selected. For an image frame capturing rate of 30 fps, five consecutive image frames may correspond to about 150-200 ms, which may be more than half of the average duration of an eye blink of 250 ms, and thus may be sufficient to detect one or more transitions of eye state from the OPEN state to the CLOSING state, from the CLOSING state to the CLOSED state, from the CLOSED state to the OPENING state, and from the OPENING state to the OPEN state.

At 1120, the authentication subsystem may create a plurality of windows of closity values for image frames based on the selected window size and a step size. For example, if the selected window size is M, each window of closity values may include a series of M closity values each corresponding to an image frame. The step size for the sliding windows may be determined based on, for example, the image frame capturing rate, and may be larger if the image frame capturing rate is higher. The step size for the sliding windows may be, for example, one, two, five, or more. For example, if the step size is two, the first window may include closity values for image frames N to N+M−1, the second window may include closity values for image frames N+2 to N+M+1, and so on.

At 1130, the authentication subsystem may determine whether an eye transition of (1) from an OPEN state to a CLOSING state, (2) from a CLOSING state to a CLOSED state, (3) from a CLOSED state to an OPENING state, or (4) from an OPENING state to an OPEN state occurs in each window, based upon the series of closity values in the window.

In one example, to detect a transition from an OPEN state to a CLOSING state, the authentication subsystem may determine whether the number of significant dips in closity value within the window is greater than a threshold value. The closity values in the window may include a significant dip if a subsequent closity value in the series of closity values in the window is, for example, about 5%, 10%, 20%, 25%, or more, lower than the previous closity value in the series of closity values. If the number of significant dips in closity value within the window is greater than a first threshold value, a closing (transition) event may be occurring during the time corresponding to the window. On the other hand, if the closity values in the series of closity values for the window are substantially the same (e.g., vary less than about 5% or 10%), the eye may be in a steady state (e.g., an OPEN state) during the time corresponding to the window. If the number of significant dips in closity value within the window is less than the first threshold value, a jump rather than a transition event may be occurring during the time corresponding to the window, which may indicate that still images of the claimed valid user with open eyes and closed eyes are being used to spoof the authentication subsystem.

In some implementations, to detect a transition from an OPEN state to a CLOSING state, the authentication subsystem may also determine whether the number of jumps in closity value within the window is lesser than a second threshold value. This may ensure that noises in the closity values (such as small increases) would not cause the authentication subsystem to ignore an eye blink. In some implementations, the authentication subsystem may also determine whether the difference between the first closity value and the last closity value within a window is greater than a third threshold value. A difference between the first closity value and the last closity value within a window greater than the third threshold value may indicate a significant change in the state of the eye from M frames ago.

A transition from an OPEN state to a CLOSING state may be detected if the number of significant dips in closity value within the window is greater than the first threshold value, the number of jumps in closity value within the window is lesser than the second threshold value, and the difference between the first closity value and the last closity value within the window is greater than a third threshold value. An example window of closity values that may indicate a transition from an OPEN state to a CLOSING state may include the series of closity values of [1.0573151, 0.9197122, 0.8532984, 0.7789989, 0.652545].

In one example, to detect a transition from a CLOSING state to a CLOSED state in a window, the authentication subsystem may determine whether a closity value in the window is below a first threshold value, which may indicate that the closity value is small enough such that the eye can be considered as closed. The authentication subsystem may also determine whether the difference between the first closity value and the last closity value within the window is greater than a second threshold that is larger than the third threshold for detecting a transition from the OPEN state to the CLOSING state, which may indicate a significant change in the state of the eye from M frames ago. If the above two conditions are met within the window, a transition from an CLOSING state to a CLOSED state may be detected.

In one example, to detect a transition from a CLOSED state to an OPENING state in a window, the authentication subsystem may determine whether the number of significant increases in closity value within the window is greater than a first threshold value, to make sure that an opening transition (as opposite to sudden jumps, a steady state, or a closing event) is occurring. The authentication subsystem may also determine whether the number of dips in closity value within a window is lesser than a second threshold value, to ensure that noises in the closity value (e.g., relatively small decrease, such as a decrease of less than 5% or 10%) may not cause the authentication subsystem to conclude that a transition from a CLOSED state to an OPENING state does not occur within the window. The authentication subsystem may further determine whether the difference between the last closity value and the first closity value within the window is greater than a third threshold value, to ensure that the state of the eye changes significantly from M frames ago.

In one example, to detect a transition from an OPENING state to an OPEN state in a window, the authentication subsystem may determine whether a closity value in the window is above a first threshold value to ensure that the eye has reached an OPEN state. The authentication subsystem may also determine whether the difference between the last closity value and the first closity value within the window is greater than a second threshold value that is larger than the third threshold value for detecting a transition from the CLOSED state to the OPENING state. If the above two conditions are met within the window, a transition from an CLOSING state to a CLOSED state may be detected.

At 1140, after a number of windows or all the plurality of windows have been examined to detect a probable transition in each window, the authentication subsystem may determine that an eye blink occurs if the transitions in four consecutive windows include a sequential transition pattern of (1) from an OPEN state to a CLOSING state, (2) from a CLOSING state to a CLOSED state, (3) from a CLOSED state to an OPENING state, and (4) from an OPENING state to an OPEN state. The authentication subsystem may increase the number of detected eye blinks for every sequential transition pattern of (OPEN→CLOSING→CLOSED→OPENING→OPEN) detected in the plurality of windows.

Referring back to FIG. 8 again, at 890, the authentication subsystem may determine whether the number of eye blinks detected in the plurality of windows is within an expected range. The expected range may be determined based on statistical data, such as the minimum and maximum eye blink rates for a person in a sober and natural state, and/or in the same age, gender, or racial group as the claimed user. Depending on the determination result, flow chart 800 may proceed to either 892 or 894.

If the number of eye blinks detected in the plurality of windows is not within the expected range, the face of the subject in the sequence of image frames may not be live. Thus, at 892, the authentication subsystem may generate a signal indicating to, for example, the user application or a server that requests the user authentication, that the liveness detection is unsuccessful, and therefore the face may not be live.

If the number of eye blinks detected in the plurality of windows is within the expected range, the face of the subject in the sequence of image frames may be live. Thus, at 894, the authentication subsystem may generate a signal indicating to, for example, the user application or a server that requests the user authentication, that the liveness detection is successful, and therefore the face may be live.

In various embodiments, feature points extracted from the sequence of image frames may be used to detect other facial motions or detect eye blinks using other techniques. For example, changes to certain portions of the mouth of the subject present in the image frames may be used to detect facial motions, such as smiles. The results of liveness detection using different techniques and/or based on different feature points may be used in combination to more accurately and more confidently determine whether the face present in the captured image frames is live.

Figure 12B:
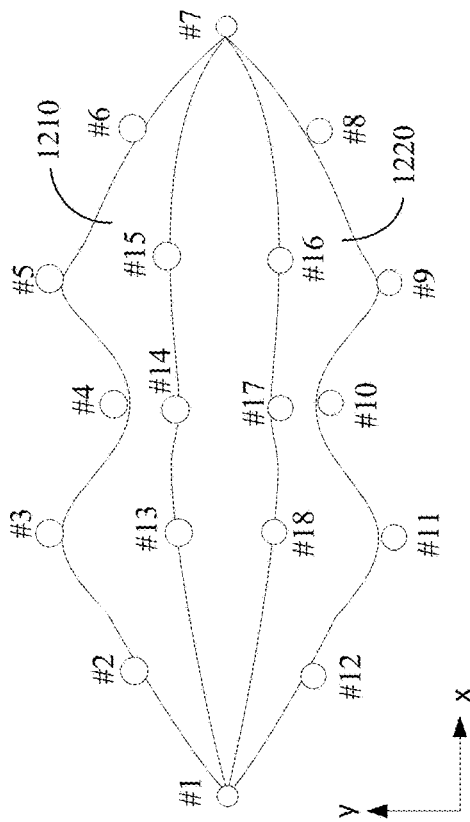
FIG. 12B illustrates an example image frame showing the mouth of a subject in another state according to certain embodiments.
Figure 12A:
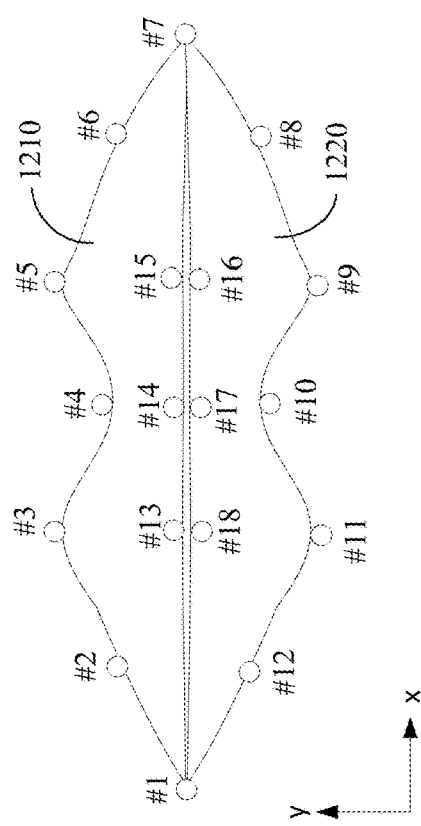
FIG. 12A illustrates an example image frame showing the mouth of a subject in one state according to certain embodiments.

FIG. 12A illustrates an example image frame 1200 depicting the mouth of a subject in one state, such as a no-smile state according to certain embodiments. As described above, feature points may be extracted from the image frame to represent the mouth of the subject. For example, as shown in FIG. 12A, 18 or more feature points may be extracted and used to represent the mouth of the subject. Some feature points may be associated with the left and right ends of the mouth, some may be associated with an upper lip 1210 of the mouth, and some may be associated with a lower lip 1220 of the mouth. From the (normalized) coordinates of the extract feature points, multiple parameters may be calculated. For example, an overall height of the mouth may be determined based on, for example, the y coordinate of feature point #3 ($y_3$) and they coordinate of feature point #11 ($y_{11}$) as $y_3-y_{11}$. The width-to-height ratio of the mouth may be determined based on, for example, the overall height of the mouth (e.g., $y_3-y_{11}$) and the x coordinates of feature point #1 ($x_1$) and feature point #7 ($x_7$) as $(x_7-x_1)/(y_3-y_{11})$. A height of the opening of the mouth may be determined based on, for example, the y coordinate of feature point #15 ($y_{15}$) and the y coordinate of feature point #16 ($y_{16}$) as $y_{15}-y_{16}$. A difference between the y coordinates of feature point #1 ($y_1$) at the left corner of the mouth and feature point #14 ($y_{14}$) at the center of the mouth may be determined to be $y_{14}-y_1$. A difference between the y coordinates of feature point #7 ($y_7$) at the right corner of the mouth and feature point #14 ($y_{14}$) at the center of the mouth may be determined to be $y_{14}-y_7$. An opening area of the mouth may also be determined, for example, based on the area of a shape (e.g., a polygon) that approximates the open area of the mouth and can be determined based on feature points #1, #13, #14, #15, #7, #16, #17, and #18.

FIG. 12B illustrates an example image frame 1250 depicting the mouth of the subject in another state, such as an open-smile state according to certain embodiments. As in FIG. 12A, feature points may be extracted from the image frame and used to represent the mouth of the subject. From the coordinates of the extract feature points, multiple parameters may be calculated. For example, an overall height of the mouth may be determined based on, for example, the y coordinate of feature point #3 ($y_3$) and the y coordinate of feature point #11 ($y_{11}$) as $y_3-y_{11}$. The width-to-height ratio of the mouth may be determined based on, for example, the overall height of the mouth (e.g., $y_3-y_{11}$) and the x coordinates of feature point #1 ($x_1$) and feature point #7 ($x_7$) as ($x_7-x_1$)/($y_3-y_{11}$). A height of the opening of the mouth may be determined based on, for example, the y coordinate of feature point #15 ($y_{15}$) and the y coordinate of feature point #16 ($y_{16}$) as $y_{15}-y_{16}$. A difference between the y coordinates of feature point #1 ($y_1$) at the left corner of the mouth and feature point #14 ($y_{14}$) at the center of the mouth may be determined to be $y_{14}-y_1$. A difference between the y coordinates of feature point #7 ($y_7$) at the right corner of the mouth and feature point #14 ($y_{14}$) at the center of the mouth may be determined to be $y_{14}-y_7$. An opening area of the mouth may also be determined, for example, based on the area of a shape (e.g., a polygon) that approximates the open area of the mouth and can be determined based on feature points #1, #13, #14, #15, #7, #16, #17, and #18.

Different motions in the mouth may cause different changes in at least some of these parameters. For example, at least some of these parameters may be different for a mouth at different states, such as a no-smile state, a closed-smile state, and an open-smile state. Thus, based on the changes in at least some of these parameters, different states of the mouth may be determined in the image frames.

FIG. 13 illustrates example data of example parameters associated with a mouth at different states as defined above with respect to FIGS. 12A and 12B according to certain embodiments. The example data shown in FIG. 13 may be based on the normalized coordinates of the feature points as discussed above with respect to FIGS. 4-7. The difference in each parameter for different states of the mouth is also indicated in the example data. For example, as shown in FIG. 13, in a no-smile state, the total height of the mouth as defined above may be, for example, 0.16462, the width-to-height ratio may be, for example, 2.44989, and so on. In a closed-smile state, the total height of the mouth may be, for example, 0.10229 (i.e., a change of about 38% with respect to the same parameter in the no-smile state), the width-to-height ratio may be, for example, 4.76279 (i.e., a change of about 94% with respect to the same parameter in the no-smile state), and so on. In an open-smile state, the total height of the mouth may be, for example, 0.23103 (i.e., a change of about 40% with respect to the same parameter in the no-smile state), the width-to-height ratio may be, for example, 1.92104 (i.e., a change of about 22% with respect to the same parameter in no-smile state), and so on.

Based on statistical data, a respective threshold value may be determined for each of the parameters associated with a mouth, as shown by the example threshold value for each parameter in FIG. 13. For example, a threshold for the change in total height of the mouth may be set to 25%, a threshold for the change in width-to-height ratio of the mouth may be set to 50%, and so on. In some implementations, if the values of the parameters in a state indicate that more than two parameters (e.g., three or more parameters) have a change greater than the corresponding threshold with respect to the no-smile state, a smile (or another motion of the mouth) may be detected. The result may be used alone, or in combination with other detection results to increase the accuracy and confidence level of the liveness detection.

Figure 14:
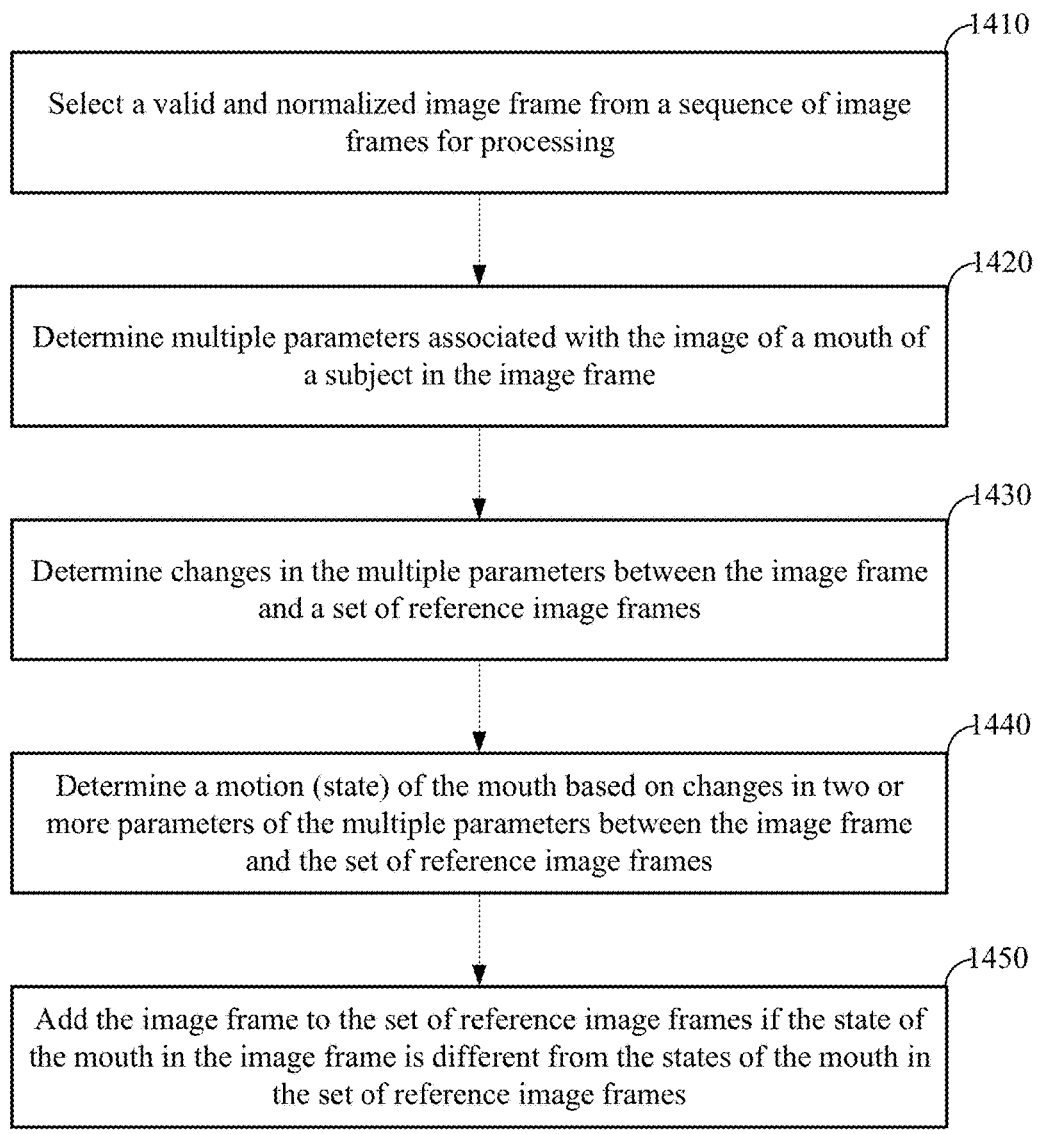
FIG. 14 is a simplified flow chart illustrating a method of liveness detection based on mouth movement according to certain embodiments.

FIG. 14 is a simplified flow chart 1400 illustrating a method of liveness detection based on mouth movement according to certain embodiments. The method may be performed by, for example, authentication subsystem 126 and/or face authentication subsystem 114 of FIG. 1. Operations described in flow chart 1400 may be performed for each of a plurality of image frames.

At 1410, the authentication subsystem may select an image frame from the sequence of valid and normalized image frames for processing. The image frame may include information regarding the timing and extracted feature points (e.g., 2-D coordinates) as described above in FIGS. 12A and 12B. The information may be saved in, for example, the metadata of the image frame. In implementations where the information regarding the extracted feature points is stored in a separate file or table, the authentication subsystem may only use the separate file or table, rather than the image frame itself.

At 1420, the authentication subsystem may determine multiple parameters associated with a mouth of the subject in the selected image frame, as described above with respect to FIGS. 12A and 12B. It is noted that the parameters described in FIGS. 12A and 12B are for illustration purposes only. Different or additional parameters may be determined and used for mouth motion detection.

At 1430, the authentication subsystem may determine the changes in the multiple parameters between the selected image frame and a set of reference image frames, as described above with respect to FIG. 13.

At 1440, the authentication subsystem may determine a movement (or a different state) of the mouth based on the changes in the multiple parameters between the image frame and the set of reference image frames. For example, if changes in two or more parameters of the multiple parameters between the image frame and each of the set of reference image frames are greater than the corresponding threshold values, the mouth in the image frame may be in a motion or a state different from any motion or state associated with the set of reference image frames. More specifically, if, for example, there are two reference image frames in the set of reference image frames and five parameters associated with the mouth are determined for each image frame, the five parameters for the selected image frame may be compared against the five parameters for each of the two reference image frames. If, for example, the selected image has any two or more parameters from the five parameters that are different from the corresponding parameters for the first reference image frame by a value greater than the corresponding threshold value, the mouth in the selected image frame may be at a different state from the state of the mouth in the first reference image frame. Similarly, if the selected image frame has any two or more parameters from the five parameters that are different from the corresponding parameters for the second reference image frame by a value greater than the corresponding threshold value, the mouth in the selected image frame may be at a different state from the state of the mouth in the second reference image frame. If the mouth in the selected image frame is at a different state from the states of the mouth in the two reference image frames, a motion of the mouth may be detected.

At 1450, if it is determined at 1440 that the mouth in the selected image frame is at a different state from the states of the mouth in the set of reference image frames, the authentication subsystem may add the selected image frame, the associated information regarding the feature points, the calculated parameters, or any combination thereof, to the set of reference image frames, which may be used as a reference for detecting mouth motions in subsequent image frames. In various embodiments, the associated information regarding the feature points or the calculated parameters for the reference image frames may be saved in a cache or a memory with a low latency for data access.

In some implementations, the feature points extracted from the sequence of image frames may be used to detect head movement, such as head rotations. For example, as described above, the feature points extracted from the image frames may be used to extract information regarding the rotation of the face on the xyz axes (i.e., pitch, yaw, and roll). The rotation angles in different image frames from the sequence of image frames may be determined, for example, with respect to an image frame in which the subject faces the camera straightly and directly, and used to determine whether the subject is making a head rotation. More specifically, in one example, a rotation angle of the head with respect to z-axis may be determined to increase or decrease gradually in a set of image frames, such as 0.5°, 1°, 2°, 2.5°, 3°, . . . , which may indicate that the head of the subject may be rotating.

In some examples, the linear or angular velocities of the rotation of two or more feature points (e.g., the tip (apex) of nose, center of an eye, a corner or center of the mouth) on the face may be calculated based on the locations of the two or more feature points in consecutive image frames. When, for example, the linear velocities of the movement of two feature points that have different distances from the (camera of the) user device are substantially the same (e.g., less than 5% or less in difference), the face of the subject may not be live.

The detection results from different liveness detection techniques or using different facial feature points in the image frames may be combined to more accurately and/or more confidently determine whether the face in the captured image frame is live. For example, a liveness detection result may have a very high confidence level if all or a majority of the different liveness detection results agree with each other. In some implementations, a classifier may be used to classify the overall liveness detection result based on the detection results from different liveness detection techniques.

It is noted that even though FIGS. 2, 3, 7, 8, 11, and 14 describe the operations as sequential processes, many of the operations can be performed in parallel or concurrently. In addition, the order of the operations may be rearranged. An operation may have additional steps not included in the figure. Some operations may be optional, and thus may be omitted in various embodiments. Some operations described in one block may be performed together with operations at another block. Furthermore, embodiments of the methods may be implemented in hardware, software, firmware, middleware, microcode, hardware description languages, or any combination thereof.

As described above, various general purpose or special purpose devices may be used to implement some of the methods or perform some of the operations disclosed herein. The devices may be portable (e.g., a mobile phone or a laptop computer) or stationary (e.g., a general purpose desktop computer or a server). Some devices may include some or all components for performing some or all operations disclosed herein. Some devices may be combined with one or more other devices to perform some or all operations disclosed herein.

Figure 15:
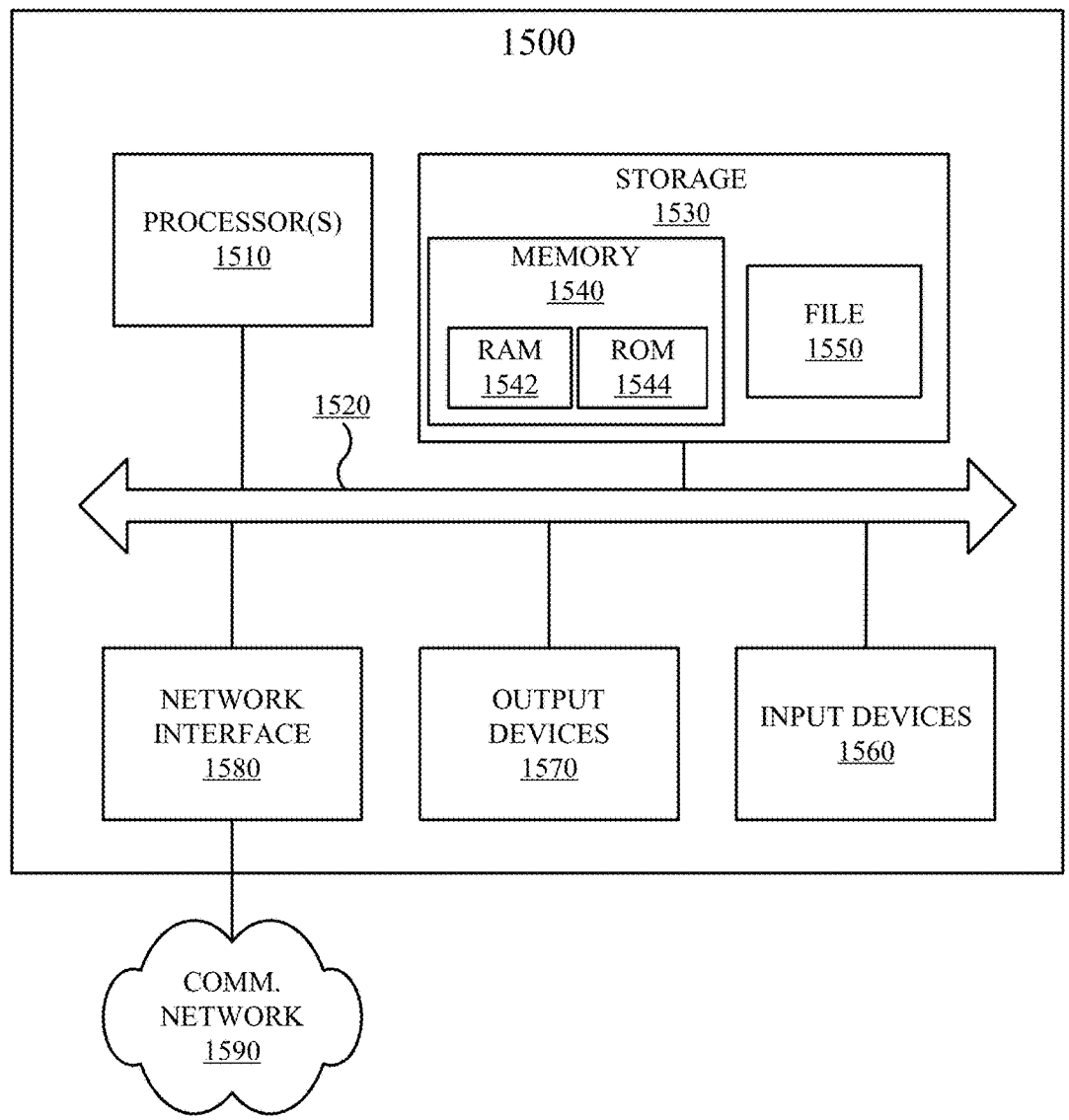
FIG. 15 is a simplified block diagram of an example computer system for implementing some of the examples disclosed herein.

FIG. 15 is a simplified block diagram of an example computer system 1500 for implementing some of the examples disclosed herein. Computer system 1500 shown in FIG. 15 can be used to implement one or more of user device 120 or server(s) 110. In this example, computer system 1500 includes one or more processors 1510, a bus 1520, a storage system 1530, one or more input devices 1560, one or more output devices 1570, a network interface 1580, and the like.

In the present example, input device(s) 1560 may include a computer mouse, a trackball, a track pad, a joystick, a wireless remote controller, a drawing tablet, a voice command system, an eye tracking system, and the like. Input device(s) 1560 may allow a user to select objects, icons, text, and the like that appear on an output device 1570 (e.g., a monitor or display device) via a command such as a click of a button or the like. Output devices 1570 may include, without limitation, a display device (e.g., a monitor), a printer, light-emitting diodes (LEDs), speakers, and/or the like.

Examples of network interface 1580 may include an Ethernet card, a modem (telephone, satellite, cable, ISDN), (asynchronous) digital subscriber line (DSL) unit, FireWire interface, universal serial bus (USB) interface, and the like. For example, network interface 1580 may be coupled to a communication network 1590, to a FireWire bus, or the like. In other embodiments, network interface 1580 may be physically integrated on the motherboard of computer system 1500, may be a software program, such as soft DSL, or the like.

Processor(s) 1510 may include, without limitation, one or more general-purpose processors, one or more special-purpose processors (e.g., digital signal processing (DSP) chips, graphics acceleration processors, application-specific integrated circuits (ASICs), and/or the like), and/or other processing structures or means, which can be configured to perform one or more of the methods described herein.

Storage system 1530 may include, without limitation, local and/or network accessible storage, and/or can include, without limitation, a disk drive, a drive array, an optical storage device, such as a compact disk read-only memory (CD-ROM) or digital versatile disk (DVD), a solid-state storage device, which may be configured to implement any appropriate data stores, including, without limitation, various file systems 1550, database structures, and/or the like. Storage system 1530 may include memory 1540, such as a random access memory (RAM) 1542, and/or a read-only memory (ROM) 1544, which can be programmable, flash-updateable, and/or the like. An operating system may be stored in file systems 1550, and may be loaded to RAM 1542 when computer system 1500 is booted. RAM 1542 and the disk drive are examples of tangible media configured to store data including executable computer code, human readable code, photos, videos, maps, and other data collected by various entities, heat maps, or the like.

In various examples, computer system 1500 may also include software that enables communications over a network using, for example, the HTTP, TCP/IP, RTP/RTSP protocols, and the like. In alternative embodiments, other communications software and protocols may also be used, such as IPX, UDP, or the like.

Figure 16:
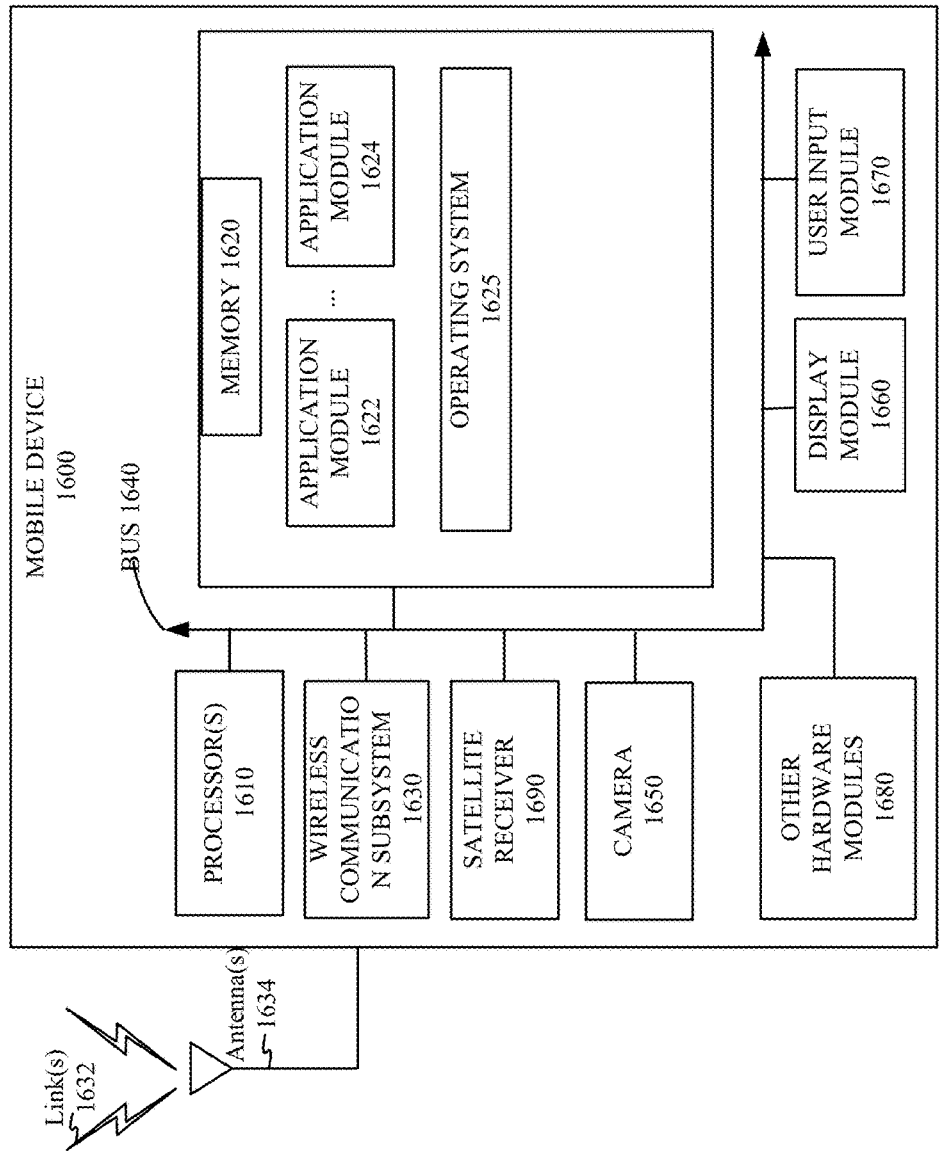
FIG. 16 is a simplified block diagram of an example mobile device for implementing some of the examples disclosed herein.

FIG. 16 is a simplified block diagram of an example mobile device 1600 for implementing some of the examples disclosed herein. Mobile device 1600 may be used to implement user device 120. In this example, mobile device 1600 may include one or more processor(s) 1610 and a memory 1620. Processor(s) 1610 may be configured to execute instructions for performing operations at a number of components, and can be, for example, a general-purpose processor or microprocessor suitable for implementation within a portable electronic device. Processor(s) 1610 may be communicatively coupled with a plurality of components within mobile device 1600. To realize this communicative coupling, processor(s) 1610 may communicate with the other illustrated components across a bus 1640. Bus 1640 may be any subsystem adapted to transfer data within mobile device 1600. Bus 1640 may include a plurality of computer buses and additional circuitry to transfer data.

Memory 1620 may be coupled to processor(s) 1610. In some embodiments, memory 1620 may offer both short-term and long-term storage and may be divided into several units. Memory 1620 may be volatile, such as static random access memory (SRAM) and/or dynamic random access memory (DRAM) and/or non-volatile, such as read-only memory (ROM), flash memory, and the like. Furthermore, memory 1620 may include removable storage devices, such as secure digital (SD) cards. Memory 1620 may provide storage of computer readable instructions, data structures, program modules, and other data for mobile device 1600. In some embodiments, memory 1620 may be distributed into different hardware modules. A set of instructions and/or code might be stored on memory 1620. The instructions might take the form of executable code that may be executable by mobile device 1600, and/or might take the form of source and/or installable code, which, upon compilation and/or installation on mobile device 1600 (e.g., using any of a variety of generally available compilers, installation programs, compression/decompression utilities, etc.), may take the form of executable code.

In some embodiments, memory 1620 may store a plurality of application modules 1622 through 1624, which may include any number of applications. Application modules 1622-1624 may include particular instructions to be executed by processor(s) 1610. In some embodiments, certain applications or parts of application modules 1622-1624 may be executable by other hardware modules 1680. In certain embodiments, memory 1620 may additionally include secure memory, which may include additional security controls to prevent copying or other unauthorized access to secure information.

In some embodiments, memory 1620 may include an operating system 1625 loaded therein. Operating system 1625 may be operable to initiate the execution of the instructions provided by application modules 1622-1624 and/or manage other hardware modules 1680 as well as interfaces with a wireless communication subsystem 1630 which may include one or more wireless transceivers. Operating system 1625 may be adapted to perform other operations across the components of mobile device 1600 including threading, resource management, data storage control and other similar functionality.

Wireless communication subsystem 1630 may include, for example, an infrared communication device, a wireless communication device and/or chipset (such as a Bluetooth® device, an 1602.11 device, a Wi-Fi device, a WiMax device, cellular communication facilities, etc.), and/or similar communication interfaces. Mobile device 1600 may include one or more antennas 1634 for wireless communication as part of wireless communication subsystem 1630 or as a separate component coupled to any portion of the system. Depending on desired functionality, wireless communication subsystem 1630 may include separate transceivers to communicate with base transceiver stations and other wireless devices and access points, which may include communicating with different data networks and/or network types, such as wireless wide-area networks (WWANs), WLANs, or wireless personal area networks (WPANs). A WWAN may be, for example, a WiMax (IEEE 802.16) network. A WLAN may be, for example, an IEEE 802.11x network. A WPAN may be, for example, a Bluetooth network, an IEEE 802.15x, or some other types of network. The techniques described herein may also be used for any combination of WWAN, WLAN, and/or WPAN. Wireless communications subsystem 1630 may permit data to be exchanged with a network, other computer systems, and/or any other devices described herein. Wireless communication subsystem 1630 may include a means for transmitting or receiving data, such as identifiers of mobile devices, position data, a geographic map, a heat map, photos, or videos, using antenna(s) 1634 and wireless link(s) 1632. Wireless communication subsystem 1630, processor(s) 1610, and memory 1620 may together comprise at least a part of one or more of a means for performing some functions disclosed herein.

Embodiments of mobile device 1600 may also include a satellite receiver 1690 capable of receiving signals from one or more SPS satellites using an SPS antenna. Satellite receiver 1690 may be used to determine a position of mobile device 1600, using conventional techniques, from SPS satellite vehicles (SVs) of an SPS system, such as global navigation satellite system (GNSS) (e.g., GPS), Galileo, Glonass, Compass, Quasi-Zenith Satellite System (QZSS) over Japan, Indian Regional Navigational Satellite System (IRNSS) over India, Beidou over China, and/or the like. Moreover, satellite receiver 1690 may use various augmentation systems (e.g., a Satellite Based Augmentation System (SBAS)) that may be associated with or otherwise enabled for use with one or more global and/or regional navigation satellite systems. An SPS system may include any combination of one or more global and/or regional navigation satellite systems and/or augmentation systems, and SPS signals may include SPS, SPS-like, and/or other signals associated with one or more such SPS systems.

Mobile device 1600 may include a display module 1660 and a user input module 1670. Display module 1660 may graphically present information, such as various instructions, from mobile device 1600 to a user. Such information may be derived from one or more application modules 1622-1624, one or more other hardware modules 1680, a combination thereof, or any other suitable means for resolving graphical content for the user (e.g., by operating system 1625). Display module 1660 may use liquid crystal display (LCD) technology, light-emitting diode (LED) technology, light emitting polymer display (LPD) technology, or some other display technology. In some embodiments, display module 1660 may be a capacitive or resistive touch screen and may be sensitive to haptic and/or tactile contact with a user. In such embodiments, display module 1660 may comprise a multi-touch-sensitive display. User input module 1670 may include, without limitation, a touchscreen, a touch pad, microphone(s), a keyboard, a mouse, button(s), dial(s), switch(es), and/or the like.

Mobile device 1600 may include a camera 1650 that may be used to take photos or videos of a user being authenticated. Camera 1650 may include, for example, a complementary metal-oxide-semiconductor (CMOS) image sensor with a few millions or tens of millions of pixels. In some implementations, camera 1650 may include two or more cameras that may be used to capture 3-D images.

In some embodiments, mobile device 1600 may include a plurality of other hardware modules 1680. Each of other hardware modules 1680 may be a physical module within mobile device 1600. While each of other hardware modules 1680 may be permanently configured as a structure, some of other hardware modules 1680 may be temporarily configured to perform specific functions or temporarily activated. Examples of other hardware modules 1680 may include, for example, an accelerometer, a pressure module, a temperature module, an audio output and/or input module (e.g., a microphone), a proximity sensor, an alternate line service (ALS) module, a capacitive touch sensor, a near field communication (NFC) module, a magnetometer, a gyroscope, an inertial sensor (e.g., a module that combines an accelerometer and a gyroscope), an ambient light sensor, a relative humidity sensor, or any other similar module operable to provide sensory output and/or receive sensory input. In some embodiments, one or more functions of other hardware modules 1680 may be implemented in software.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, systems, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing various embodiments. Various changes may be made in the function and arrangement of elements without departing from the spirit and scope of the present disclosure.

Also, some embodiments were described as processes depicted as flow diagrams or block diagrams. Although each may describe the operations as a sequential process, many of the operations may be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It will be apparent to those skilled in the art that substantial variations may be made in accordance with specific requirements. For example, customized or special-purpose hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium," as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media such as compact disk (CD) or digital versatile disk (DVD), punch cards, paper tape, any other physical medium with patterns of holes, a RAM, a programmable read-only memory (PROM), an erasable programmable read-only memory (EPROM), a FLASH-EPROM, any other memory chip or cartridge, a carrier wave as described hereinafter, or any other medium from which a computer can read instructions and/or code. A computer-program product may include code and/or machine-executable instructions that may represent a procedure, a function, a subprogram, a program, a routine, an application (App), a subroutine, a module, a software package, a class, or any combination of instructions, data structures, or program statements.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AC, BC, AA, ABC, AAB, AABBCCC, etc.

Further, while certain embodiments have been described using a particular combination of hardware and software, it should be recognized that other combinations of hardware and software are also possible. Certain embodiments may be implemented only in hardware, or only in software, or using combinations thereof. In one example, software may be implemented with a computer program product containing computer program code or instructions executable by one or more processors for performing any or all of the steps, operations, or processes described in this disclosure, where the computer program may be stored on a non-transitory computer readable medium. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques, including, but not limited to, conventional techniques for inter-process communications, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method comprising:
   receiving, by a computing system, a sequence of image frames captured of a face of a subject;
   calculating, for each image frame in a set of image frames from the sequence of image frames, an eye close value for the image frame based upon a plurality of angles defined by feature points at two or more corners of an eye in the image frame, wherein the eye close value calculated for the image frame is indicative of a degree to which the eye in the image frame is closed, and wherein calculating the eye close value for the image frame includes calculating a sum value of a first angle associated with a first corner of the eye in the image frame and a second angle associated with a second corner of the eye in the image frame;
   determining a number of eye blinks occurring in the set of image frames based upon comparison between the eye close values calculated for the set of image frames and a threshold eye close value;
   determining liveness of the face of the subject based upon the number of eye blinks; and
   enabling authentication of the subject based upon the liveness determination.

2. The method of claim 1, wherein calculating the eye close value for the image frame based upon the plurality of angles comprises:
   determining a polygon that represents an open area of the eye in the image frame, wherein each vertex of the polygon corresponds to a feature point of the eye in the image frame,
   wherein the plurality of angles includes two or more internal angles of the polygon.

3. The method of claim 1, wherein calculating the eye close value for the image frame based upon the plurality of angles further comprises:
   determining a third angle associated with a first area of a second eye of the subject in the image frame;
   determining a fourth angle associated with a second area of the second eye in the image frame; and
   calculating the eye close value for the image frame based upon the first angle, the second angle, the third angle, and the fourth angle.

4. The method of claim 1, wherein calculating the eye close value for the image frame further comprises:
   determining a shape corresponding to an opening area associated with the eye in the image frame; and
   calculating the eye close value based upon an area of the shape.

5. The method of claim 1, further comprising:
   for each image frame in a reference set of image frames from the sequence of image frames:
   determining a first reference angle associated with the eye in the image frame;
   determining a second reference angle associated with the eye in the image frame; and
   calculating a sum value for the image frame based upon the first reference angle and the second reference angle; and
   determining a maximum sum value among the sum values calculated for the reference set of image frames;
   wherein calculating the eye close value for each image frame in the set of image frames from the sequence of image frames comprises:
   calculating the eye close value for the image frame based upon the sum value calculated for the image frame and the maximum sum value.

6. The method of claim 1, wherein determining the number of eye blinks comprises:
   determining a sequence of eye transitions based upon the eye close values calculated for the set of image frames, wherein an eye transition in the sequence of eye transitions includes a transition from an OPEN state to a CLOSING state, a transition from the CLOSING state to a CLOSED state, a transition from the CLOSED state to an OPENING state, or a transition from the OPENING state to the OPEN state; and
   determining an occurrence of an eye blink in response to detecting a transition of the eye from the OPEN state to the CLOSING state, followed by a transition of the eye from the CLOSING state to the CLOSED state, followed by a transition of the eye from the CLOSED state to the OPENING state, and followed by a transition of the eye from the OPENING state to the OPEN state in consecutive image frames from the set of image frames.

7. The method of claim 6, wherein determining the sequence of eye transitions comprises:
   detecting a transition from the OPEN state to the CLOSING state, from the CLOSING state to the CLOSED state, from the CLOSED state to the OPENING state, or from the OPENING state to the OPEN state, based upon a change in eye close value in a subset of consecutive image frames from the set of image frames.

8. The method of claim 1, further comprising determining the liveness of the face of the subject based upon a smile of the subject detected in the set of image frames, wherein detecting the smile of the subject comprises:
   determining, for each frame in a second set of image frames from the set of image frames, at least two parameters of:
   an overall height of a mouth of the subject;
   a width-to-height ratio of the mouth;
   a height of opening of the mouth;
   a difference in height between a left corner of the mouth and a center of the mouth;
   a difference in height between a right corner of the mouth and the center of the mouth; or
   an opening area of the mouth; and
   detecting the smile of the subject based upon changes of the at least two parameters in the second set of image frames.

9. The method of claim 1, wherein receiving the sequence of image frames captured of the face of the subject comprises:
   receiving, for each image frame of the sequence of image frames, information regarding a plurality of feature points for the face of the subject in the image frame.

10. The method of claim 9, further comprising, for each image frame in the sequence of image frames, determining:
an angle of rotation of a head of the subject with respect to a position of the head in a reference image frame from the sequence of image frames; or
a velocity of movement of a feature point from the plurality of feature points on the face with respect to a previous image frame in the sequence of image frames; and
indicating that the image frame is invalid in response to determining that the angle of rotation or the velocity of movement is greater than a threshold value.

11. The method of claim 9, further comprising, for each image frame in the set of image frames:
determining an angle between an axis of the image frame and a line determined by two feature points of the plurality of feature points; and
rotating the plurality of feature points on the face of the subject by the angle with respect to a reference feature point on the face of the subject.

12. The method of claim 9, further comprising, for each image frame in the set of image frames:
determining a minimum bounding box that includes all feature points of the plurality of feature points on the face of the subject in the image frame;
for each feature point in the plurality of feature points in the image frame:
determining a location of the feature point relative to a reference point of the minimum bounding box; and
scaling the location of the feature point by a factor determined based upon a width or height of the minimum bounding box.

13. The method of claim 1, wherein determining the liveness of the face of the subject comprises indicating successful liveness detection of the face upon determining that:
the number of eye blinks occurring in the set of image frames is within a range; and
a smile or a head movement of the subject is detected in the set of image frames.

14. The method of claim 1, further comprising:
upon determining that the face of the subject is live, sending at least a subset of image frames from the set of image frames to a server for verifying that the face of the subject is live.

15. A non-transitory computer-readable storage medium storing a plurality of instructions executable by one or more processors, the plurality of instructions, when executed by the one or more processors, cause the one or more processors to:
receive a sequence of image frames captured of a face of a subject;
calculate, for each image frame in a set of image frames from the sequence of image frames, an eye close value for the image frame based upon a plurality of angles defined by feature points at two or more corners of an eye in the image frame, wherein the eye close value calculated for the image frame is indicative of a degree to which the eye in the image frame is closed, and wherein calculating the eye close value for the image frame includes calculating a sum value of a first angle associated with a first corner of the eye in the image frame and a second angle associated with a second corner of the eye in the image frame;
determine a number of eye blinks occurring in the set of image frames based upon comparison between the eye close values calculated for the set of image frames and a threshold eye close value;
determine liveness of the face of the subject based upon the number of eye blinks; and
enable authentication of the subject based upon the liveness determination.

16. The non-transitory computer-readable storage medium of claim 15, wherein the plurality of instructions cause the one or more processors to determine the number of eye blinks by:
determining a sequence of eye transitions based upon the eye close values calculated for the set of image frames, wherein an eye transition in the sequence of eye transitions includes a transition from an OPEN state to a CLOSING state, a transition from the CLOSING state to a CLOSED state, a transition from the CLOSED state to an OPENING state, or a transition from the OPENING state to the OPEN state; and
determining an occurrence of an eye blink in response to detecting a transition of the eye from the OPEN state to the CLOSING state, followed by a transition of the eye from the CLOSING state to the CLOSED state, followed by a transition of the eye from the CLOSED state to the OPENING state, and followed by a transition of the eye from the OPENING state to the OPEN state in consecutive image frames from the set of image frames.

17. The non-transitory computer-readable storage medium of claim 15, wherein the plurality of instructions cause the one or more processors to determine the liveness of the face of the subject based upon the number of eye blinks by:
indicating successful liveness detection of the face upon determining that:
the number of eye blinks occurring in the set of image frames is within a range; and
a smile or a head movement of the subject is detected in the set of image frames.

18. A system comprising:
one or more processors; and
a non-transitory computer-readable medium including instructions that, when executed by the one or more processors, cause the one or more processors to perform operations including:
receiving a sequence of image frames captured of a face of a subject;
calculating, for each image frame in a set of image frames from the sequence of image frames, an eye close value for the image frame based upon a plurality of angles defined by feature points at two or more corners of an eye in the image frame, wherein the eye close value calculated for the image frame is indicative of a degree to which the eye in the image frame is closed, and wherein calculating the eye close value for the image frame includes calculating a sum value of a first angle associated with a first corner of the eye in the image frame and a second angle associated with a second corner of the eye in the image frame;
determining a number of eye blinks occurring in the set of image frames based upon comparison between the eye close values calculated for the set of image frames and a threshold eye close value;
determining liveness of the face of the subject based upon the number of eye blinks; and
enabling authentication of the subject based upon the liveness determination.

19. The system of claim 18, wherein determining the number of eye blinks occurring in the set of image frames comprises:

determining a sequence of eye transitions based upon the eye close values calculated for the set of image frames, wherein an eye transition in the sequence of eye transitions includes a transition from an OPEN state to a CLOSING state, a transition from the CLOSING state to a CLOSED state, a transition from the CLOSED state to an OPENING state, or a transition from the OPENING state to the OPEN state; and determining an occurrence of an eye blink in response to detecting a transition of the eye from the OPEN state to the CLOSING state, followed by a transition of the eye from the CLOSING state to the CLOSED state, followed by a transition of the eye from the CLOSED state to the OPENING state, and followed by a transition of the eye from the OPENING state to the OPEN state in consecutive image frames from the set of image frames.

* * * * *